United States Patent

Hargis et al.

[11] Patent Number: 6,154,259
[45] Date of Patent: *Nov. 28, 2000

[54] MULTI-BEAM LASER SCANNING DISPLAY SYSTEM WITH SPECKLE ELIMINATION

[75] Inventors: David E. Hargis; Charles G. Fink, both of San Diego; Robert A. Bergstedt, Carlsbad, all of Calif.; Graham W. Flint, Albuquerque, N. Mex.

[73] Assignee: Photera Technologies, Inc., San Diego, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/978,655

[22] Filed: Nov. 26, 1997

Related U.S. Application Data

[60] Provisional application No. 60/031,697, Nov. 25, 1996.

[51] Int. Cl.⁷ ..................................................... H04N 5/74
[52] U.S. Cl. .......................... 348/756; 359/599; 353/69; 362/355; 349/64
[58] Field of Search ........................ 353/69, 30; 359/557, 359/707, 599; 349/64; 348/750, 745, 756, 758, 744, 781, 785, 786; 430/363, 395; 362/355

[56] References Cited

U.S. PATENT DOCUMENTS

| | | |
|---|---|---|
| 3,507,984 | 4/1970 | Stavis . |
| 3,549,800 | 12/1970 | Baker . |
| 3,571,493 | 3/1971 | Baker et al. . |
| 3,587,424 | 6/1971 | Olsasky .................................. 359/599 |
| 3,621,133 | 11/1971 | Baker et al. . |
| 3,633,999 | 1/1972 | Buckles .................................. 350/171 |
| 3,636,251 | 1/1972 | Daly et al. . |
| 3,721,756 | 3/1973 | Baker . |
| 3,727,001 | 4/1973 | Gottlieb . |
| 3,737,573 | 6/1973 | Kessler . |
| 3,762,791 | 10/1973 | Fournier et al. . |

(List continued on next page.)

FOREIGN PATENT DOCUMENTS

| | | |
|---|---|---|
| 458270 | 11/1991 | European Pat. Off. . |
| 488903 | 6/1992 | European Pat. Off. . |
| 43 11 112 | 5/1995 | European Pat. Off. . |
| 660593 | 6/1995 | European Pat. Off. . |
| 676740 | 10/1995 | European Pat. Off. . |
| 696875 | 2/1996 | European Pat. Off. . |

(List continued on next page.)

OTHER PUBLICATIONS

Iwai, Toshiaki, et al., *Speckle Reduction In Coherent Information Processing*, Proceedings of the IEEE, vol. 84, No. 5, May 1996.

Wang, Lingli et al., *Speckle Reduction In Laser Projection Systems By Diffractive Optical Elements*, Applied Optics, vol. 37, No. 10, Apr. 1, 1998.

Yamamoto et al., *Laser Displays*, pp. 1–63 Not Dated.

*Primary Examiner*—Victor R Kostak
*Attorney, Agent, or Firm*—Law Offices of James D. McFarland

[57] ABSTRACT

A display system includes blue, green, and red laser light sources and light shaping devices which receive the laser light from the laser light sources and shapes the light into a number of approximately identical beamlets. The beamlets are modulated individually and the modulated beamlets are combined. The combining results in an output of beamlets, each of which comprises three input beamlets of each of the colors red, green, and blue. The resultant beamlets can then be scanned onto a display screen.

26 Claims, 26 Drawing Sheets

U.S. PATENT DOCUMENTS

| | | |
|---|---|---|
| 3,818,129 | 6/1974 | Yamamoto . |
| 3,958,863 | 5/1976 | Isaacs et al. . |
| 3,977,770 | 8/1976 | Isaacs et al. . |
| 3,994,569 | 11/1976 | Isaacs et al. . |
| 4,035,068 | 7/1977 | Rawson . |
| 4,110,014 | 8/1978 | Yevick ........................................ 350/342 |
| 4,155,630 | 5/1979 | Ih . |
| 4,380,023 | 4/1983 | Mir et al. ................................... 358/72 |
| 4,390,235 | 6/1983 | Minoura . |
| 4,470,075 | 9/1984 | Yoshimoto et al. . |
| 4,517,608 | 5/1985 | Maeda et al. . |
| 4,720,747 | 1/1988 | Crowley . |
| 4,796,961 | 1/1989 | Yamada et al. . |
| 4,851,918 | 7/1989 | Crowley . |
| 4,930,849 | 6/1990 | Tanaka ........................................ 350/6.6 |
| 5,032,924 | 7/1991 | Brown et al. . |
| 5,033,814 | 7/1991 | Brown et al. . |
| 5,140,427 | 8/1992 | Nakane et al. . |
| 5,185,617 | 2/1993 | Takanashi et al. . |
| 5,253,110 | 10/1993 | Ichihara et al. ........................... 359/619 |
| 5,283,694 | 2/1994 | Frady . |
| 5,317,348 | 5/1994 | Knize ........................................ 353/31 |
| 5,365,354 | 11/1994 | Jannson et al. ............................ 359/15 |
| 5,424,771 | 6/1995 | Yu . |
| 5,440,352 | 8/1995 | Deter et al. . |
| 5,485,225 | 1/1996 | Deter et al. . |
| 5,504,602 | 4/1996 | Farmer ........................................ 359/69 |
| 5,517,359 | 5/1996 | Gelbart . |
| 5,519,518 | 5/1996 | Watanabe et al. . |
| 5,552,916 | 9/1996 | O'Callaghan et al. ................... 359/95 |
| 5,610,647 | 3/1997 | Takada . |
| 5,694,180 | 12/1997 | Deter et al. . |
| 5,715,021 | 2/1998 | Gibeau et al. ........................... 348/250 |
| 5,851,740 | 12/1998 | Sawyer ..................................... 430/363 |

FOREIGN PATENT DOCUMENTS

| | | |
|---|---|---|
| 2371107 | 6/1978 | France . |
| 2577371 | 8/1986 | France . |
| 2581780 | 11/1986 | France . |
| 31 37 031 | 4/1982 | Germany . |
| 31 52 020 | 7/1983 | Germany . |
| 41 39 842 | 3/1994 | Germany . |
| 43 24 849 | 2/1995 | Germany . |
| 195 06 595 | 2/1996 | Germany . |
| 195 01 525 | 4/1996 | Germany . |
| 196 32 089 | 2/1997 | Germany . |
| 2-244022 | 9/1990 | Japan . |
| 56-109314 | 3/1996 | Japan . |
| 2252472 | 8/1992 | United Kingdom . |
| 90/13158 | 11/1990 | WIPO . |
| 91/11820 | 8/1991 | WIPO . |
| 92/03862 | 3/1992 | WIPO . |
| 92/22109 | 12/1992 | WIPO . |
| 94/18802 | 8/1994 | WIPO . |
| 95/10159 | 4/1995 | WIPO . |
| 96/03676 | 2/1996 | WIPO . |

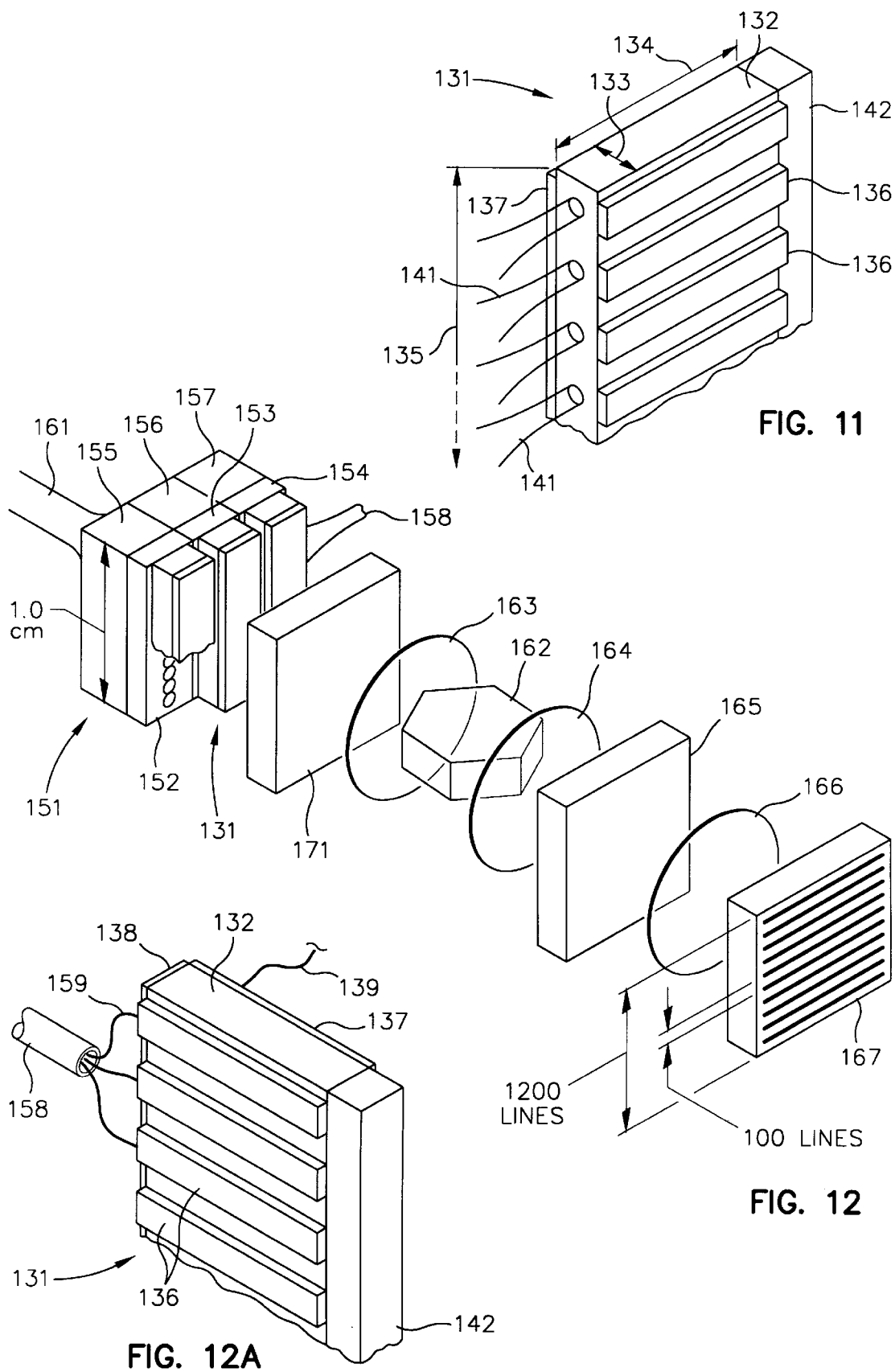

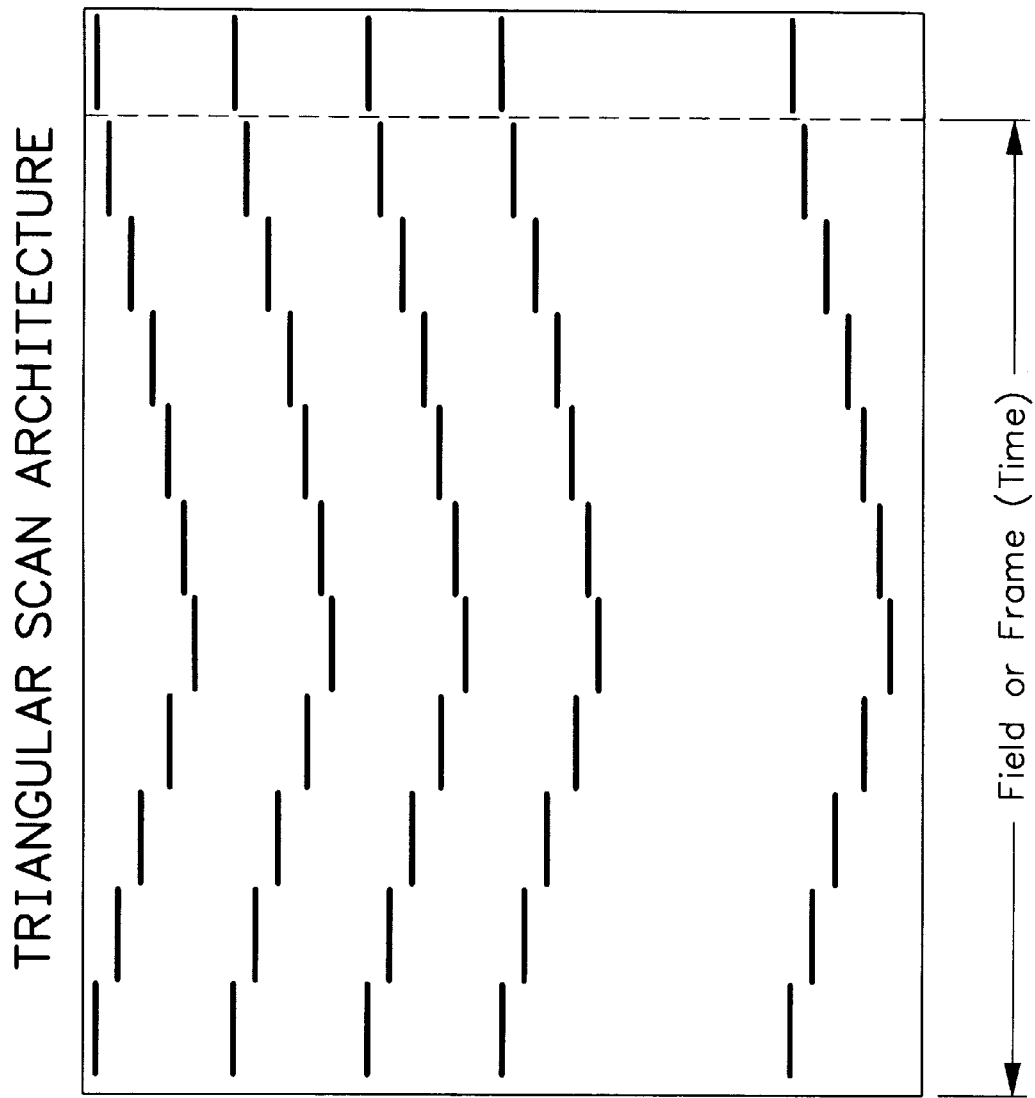
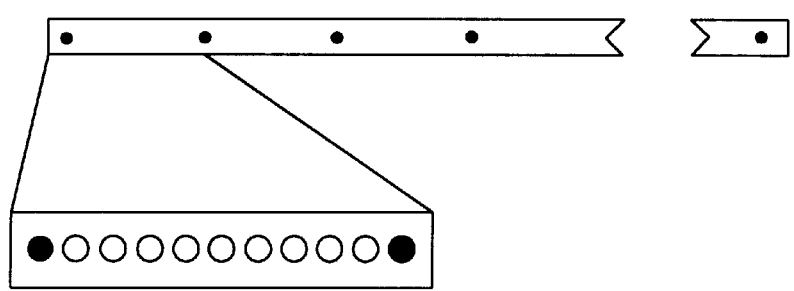
FIG. 18

MULTI-BEAM LASER SCANNING DISPLAY SYSTEM WITH SPECKLE ELIMINATION

CROSS REFERENCE AND RELATED APPLICATIONS

The benefit is hereby claimed under 35 U.S.C. §119(e) to U.S. provisional application No. 60/031,697, filed Nov. 25, 1996.

TECHNICAL FIELD

This invention relates to projection and display systems. Additionally, it relates to projection display systems utilizing laser light.

DESCRIPTION OF THE RELATED ART

Rapid advances in processing of information have placed ever increasing demands on the display systems which transfer such information to viewers in a variety of settings. One serious limitation has been in the area of the quality of display systems meeting the demands of high frame rates and high resolution with compact, cost effective, and efficient optical sources.

Two basic principles, light-modulation and direct emission, are used in video projectors. In a light-modulation design, a beam of light passes through an optical array which is capable of switching individual display elements (pixels) on or off. Liquid crystal display (LCD) panels are common light modulators. Other, more exotic modulators, such as oil films and deformable micro-mirrors, are also available. Direct-emission projectors emit their own light. The most common direct-emission device is the CRT projector, used in home TV projectors and in high power versions for large screen industrial use. Direct-emission projectors are inherently simpler than light-modulation projectors. Conceptually, the direct emission projector consists only of a controllable light source and optics. The evolution of the CRT projector illustrates how, owing to its inherent simplicity, a direct-emission display mechanism can be readily produced and later scaled-up to higher brightness and resolution levels.

As the resolution requirement of high definition television (HDTV) and computer displays increase, CRT-based projectors reach some basic physical limits. A breakthrough is necessary to extend the resolution and brightness limits of this mainstream projection technology. Unfortunately, there are very few viable direct-emission technologies, so designers have looked for other ways to project video and computer information. The result is a host of light-modulation projectors using many different techniques. However, projectors of this type share a set of common problems. One of them is the need for an efficient light source which maximizes the amount of light that is passed through the modulator. Also, the modulation device must be scaleable to a reasonably small size. The design issues associated with these needs are difficult and complex, and in many cases they directly limit the achievable results.

To better understand the nature of limitations associated with previous technology, it becomes instructive to review briefly the operating characteristics of four principal contenders in the video projection arena. In order of review, these contenders are as follows: CRT projectors, light valve projectors, passive-matrix panels and active-matrix panels.

CRT Projectors

Projection CRTs are similar to conventional monochrome CRTs, except that they are operated at much higher beam currents. Color systems are built using three independent CRT systems, each with its own lens. The user must make periodic convergence adjustments to bring the three beams into color registration. Attempts to produce single-lens projectors, where the three color tubes are internally converged at the factory, have not been widely accepted.

Light Valve Projectors

Light valve projectors have been developed to overcome some of the deficiencies of the CRT projectors. An advantage of light valve systems is that the light source and modulating element are decoupled. Light valve projectors based on the electron beam oil film light valve were developed over 25 years ago. In such systems, an oil film is used as the image source. Intensity of the projected light is controlled by the amplitude of the deformation of the oil film. However, they are very complex, bulky, expensive, and are difficult to set up and maintain.

An alternative to the oil film approach is provided by the LCD light valve. Here the LCD matrix is not used as a simple shutter that reduces the input light, but as a stimulus responsive to the input signal is used to activate the LCD material, which then is coupled to a separate output light source. Extremely high resolutions (5000×7000) have been achieved via the LCD approach. However, due to thermal inertia, the writing rate is very slow at this resolution, requiring 3.5 minutes to update a display using two 40 milliwatt lasers. Ultra high resolution is thus offset by very slow writing speed and very high cost.

Passive-Matrix Panels

A simpler method for using an LCD panel as a light modulator is that of interposing the LCD panel between a light source and the projection optics. Such panels can be activated by either of two approaches, either passive-matrix and active-matrix. In both passive and active drive technologies, the LCD cells are arranged in a matrix of rows and columns, and are driven by row and column driver circuits. In a passive-matrix drive system, the LCD cell alone exists at each intersection. A time-multiplexing scheme is used to energize each of the LCD cells in the matrix. Unfortunately, the slow response time of passive-matrix panels makes them unsuitable for displaying quickly changing information such as television signals. Also, crosstalk between LCD cells is a significant disadvantage.

Active-Matrix Panels

An active-matrix panel contains a switching device such as a thin film transistor (TFT), and a storage element (capacitor), in addition to the LCD cell at every LCD site. Each switch/capacitor acts as a "sample-hold" (S/H) circuit for the briefly appearing pulses from the multiplexed drive system. Each LCD cell, driven by its own S/H circuit, is thus decoupled from the other LCD cells, minimizing crosstalk. Furthermore, active-matrix LCD cells can be formulated to respond quickly. Update rates under 50 milliseconds are easily achieved with active-matrix panels. However, active-matrix panels are not easy to manufacture, requiring an impressive range of challenging technologies. The overall yield is the product of a series of process steps, at each of which losses typically occur.

The use of lasers in the production of images, and in particular, the production of a sequential set of electrical signals which represents an original picture for direct display through the use of lasers ("video imaging") is known in the art. See for example, U.S. Pat. Nos. 3,549,800 and 3,721,756 (Baker); 3,571,493 and 3,621,133 (Baker et al.); 3,737,573 (Kessler); 3,818,129 (Yamamoto); 3,958,863, 3,977,770, and 3,994,569 (Isaacs et al.); 3,636,251 (Daly et al.); and 4,720,747 and 4,851,918 (Crowley). See also, Taneda et al., "High-Quality Laser Color Television Display," Journal of the Society of Motion Pictures and Television Engineers, Volume 82, No. 6 (1973); Taneda et al., "A 1125 Scanning-Line Laser Color TV Display," SID international Symposium and Expedition (1973); and Yamamoto, "Laser Displays," Advances and Image Pick-up and Display, Academic Press, Inc., Vol. 2 (1975); and Glenn, "Displays, High Definition Television and Lasers," SID International Symposium and Expedition (1993). For general references to video imaging, see U.S. Pat. Nos. 3,507,984 (Stavis); and 3,727,001 (Gottlieb).

SUMMARY OF THE INVENTION

Broadly speaking, the invention comprises a scanning display system which uses a plurality of laser sources to produce images. The laser sources may be diode pumped microlaser, diode laser arrays or other suitable sources of laser light.

One embodiment of the invention is a high resolution image project system comprising: a laser source for each of the three primary colors of the image projection system; a beam shaping apparatus to form multiple beamlets from the laser light from the laser sources; a modulating system for modulating the beamlets; an apparatus for two dimensional scanning of the outputs of each said combined laser beam output; and an optical means for forming the scanned beams into a projection beam.

The objects, advantages and features of the invention will be more readily appreciated from the following detailed description; when read in conjunction with the accompanying drawings.

BRIEF DESCRIPTION OF DRAWINGS

FIG. 11 is a perspective view of a linear array spatial light modulator.

FIG. 12 is a conceptual schematic diagram similar to FIG. 1 of an embodiment of the invention, employing several of the modulators shown in FIG. 11.

FIG. 12A is an enlarged perspective view of a spatial light modulator in the same orientation in which it is shown in FIG. 12.

FIG. 18 illustrates a triangular image scanning format.

DETAILED DESCRIPTION

Recent advances in diode laser-pumped solid-state lasers have made possible compact, efficient, visible, coherent microlaser sources. Applications requiring small size and low weight are one use for microlaser projection systems. Such applications can utilize the well developed near-IR diode laser technology as a pump source for rare-earth ion doped solid-state lasers, thereby facilitating the conversion of the near-IR radiation to coherent, narrow band, visible light. Alternatively, visible heterostructure diode lasers are also amenable to the disclosed display configuration.

Some embodiments of the present invention employ visible microlaser technology. As mentioned previously herein, other laser sources may be used including heterostructure diode lasers. The term "lasers" will be used herein to generally encompass suitable laser sources. In addition some embodiments utilize beamlets which are generated from a single laser beam so it should be understood that where appropriate the array of beams from an array of laser sources can be substituted with the beamlets from a single source and vice versa.

A red/green/blue (RGB) microlaser system, consisting of three lasers or laser arrays, each operating at a fundamental color, is used for an efficient, high brightness, white light projection source for display applications. In this context, the microlaser operation has been achieved at 650 nm, 530 nm, 470 nm, and 450 nm, as discussed below.

To satisfy typical HDTV requirements, an array of 1200 lasers or 1200 beamlets is scanned horizontally in approximately 14.3 ms to attain a resolution of 1200 lines by 1400 pixels. Alternatively, arrays containing fewer individual microlasers or beamlets can be used in a variety of multi-scan geometries. For example, in one of the multi-scan approaches disclosed herein, a red, green and blue array of 120 microlaser elements or beamlets each are employed. The arrays of light sources are scanned in two dimensions. With each horizontal scan 120 video lines are written, requiring 10 scans to complete the 1200 line image. While the arrays are scanned they can be intensity modulated by an electrical current applied to the individual diode laser pumping sources.

Figure 1:
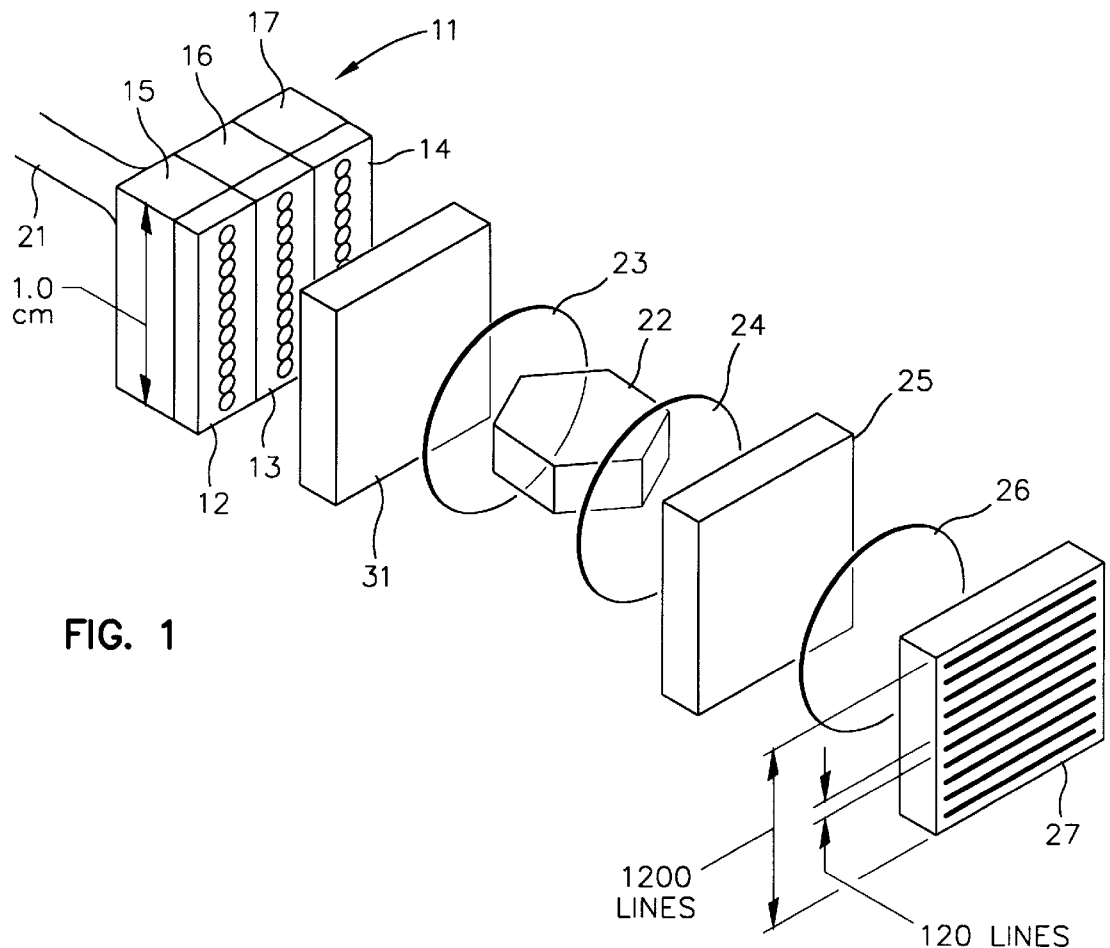
FIG. 1 is a conceptual schematic diagram of a display system.
Figure 2:
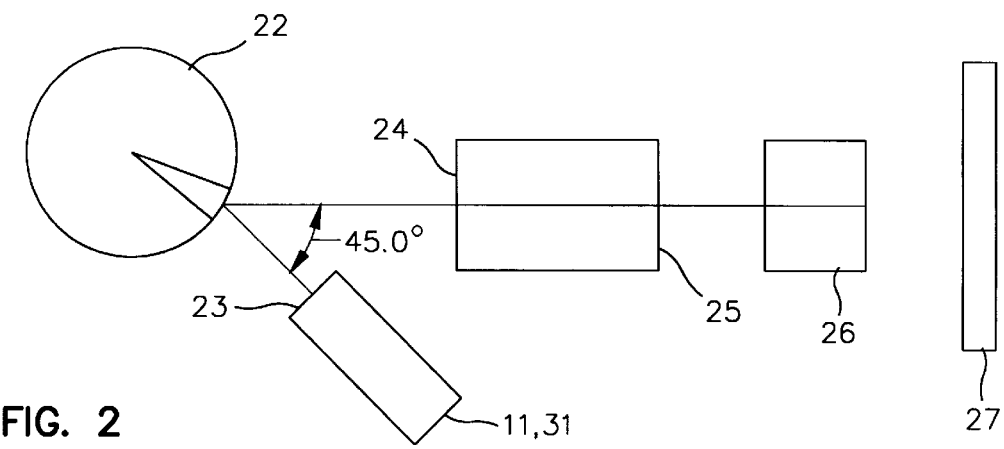
FIG. 2 is a schematic diagram of functional elements of a display system.

An exemplary embodiment of the invention is shown in FIGS. 1 and 2. In these figures there is shown a light generator microlaser array module 11 comprised of an array 12 of 120 red microlaser elements, an array 13 of 120 green microlaser elements, and an array 14 of 120 blue microlaser elements. Directly adjacent each microlaser array is equivalent pumping diode array 15, 16 and 17, respectively. Video or image signals, which control diode power, are applied to the pumping diodes through a cable 21. The powered and modulated light beams from the arrays 12, 13, 14 are applied to a scanning polygon mirror 22 through a relay lens assembly 23. The scanning light beams then pass through an imaging lens assembly 24, a speckle eliminator 25, a projection lens 26, and a projection screen 27. The speckle eliminator 25 is a preferred element of the system, but it is not an essential element.

The system shown in FIG. 1 includes a projection screen 27, which has certain parameters. As stated previously, that screen may be as large as 7.5 feet diagonal. It may be a flat screen or wall, or a concave screen. The system is suited to any type of projection surface including those typically used for motion picture projection systems.

Many high resolution formats can be achieved with the array approach and with the apparatus shown in FIGS. 1 and 2, or a modification thereof. For example, to satisfy the HDTV requirements of 1200 lines by 1400 pixels with a frame refresh rate of 70 Hz non-interlaced, the individual microlasers within a 120 element array can be intensity modulated at a rate of 490 KHz. Meanwhile, the effective gray level and color of each pixel is determined by the amplitude of the diode current and the relative powers in the RGB beams.

Different scanning formats are accomplished with the polygonal scanner 22 which is configured with successively tilted facets. The tilt angle between two facets is such that the projected image shifts during the polygon's rotation by 120 lines when the next horizontal scan is performed. For example, the tilt angles between two adjacent facets would be 0.6°. Known techniques of diamond machining are sufficient to form the scanning polygon mirror 22.

A complete projection system based upon the above described technique, a schematic of which is shown in FIGS. 1 and 2, accepts the outputs of three laser arrays, combines them, scans them, and projects them as a picture upon a large screen. As evidenced from the figures, an optical train following the laser arrays comprises six principal elements. These elements include a dichroic prism combiner 31, the relay lens 23, the polygonal scanning mirror 22, the imaging lens 24, the speckle elimination element 25, and the projection lens 26. The final image is focused onto the projection screen 27.

Figure 3:
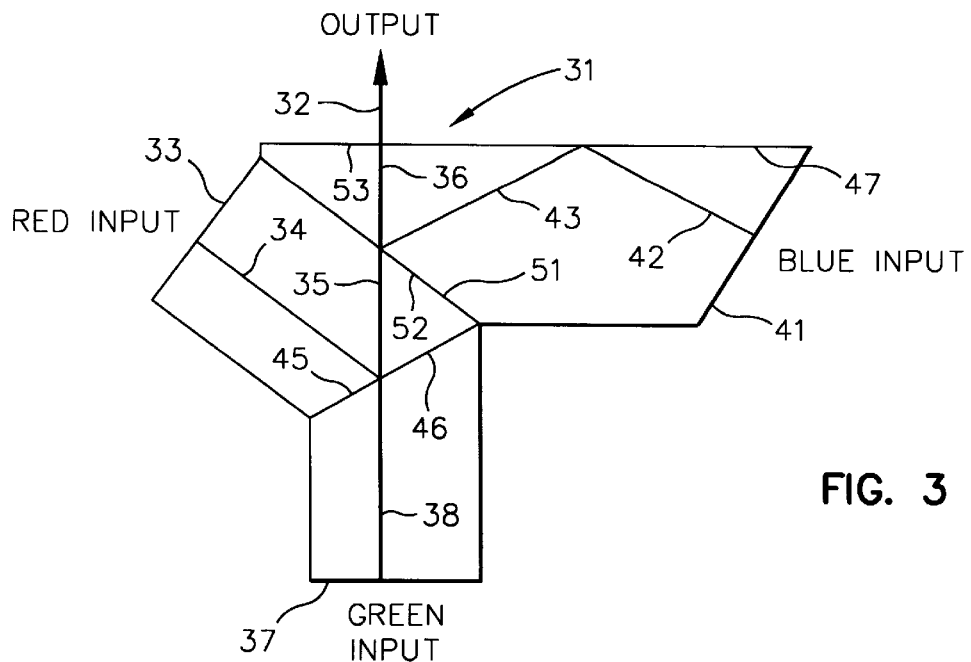
FIG. 3 is a plan view of a dichroic prism assembly.

The geometry of the dichroic prism combiner 31 of FIG. 3 is arranged such that, when viewed from a prism output 32, the outputs from individual microlaser arrays are precisely registered one with respect to another. From FIGS. 6 and 7 it can be seen how the microlaser arrays are arranged with respect to the dichroic prism combiner 31. The red array 12 is paired with and abuts against face 33 of the prism combiner 31. The red microlaser output light beam follows path 34, 35, 36 to the output beam 32. The green array 13 similarly abuts a face 37 of the prism. The green microlaser output light beam follows path 38, 35, 36 to the output beam 32. The blue array 14 abuts a face 41 of the prism. The blue microlaser output light beam follows a path 42, 43, 36 to the output beam 32. As is well known in the art, faces 45, 47, 51, 52 and 53 of the dichroic prism are appropriately coated to reflect certain wavelengths and to pass others. For example, the face 45 reflects the red light waves while the faces 52 and 53 are transparent to red. The locations of the red, green and blue inputs with respect to the prism and the structural geometry of the system are such as to allow maximum convenience in microlaser array accessibility. The associated relay lens 23 produces an exit pupil of small diameter, matched with the size of and distance to a face of the polygonal scanning mirror 22.

Figure 4:
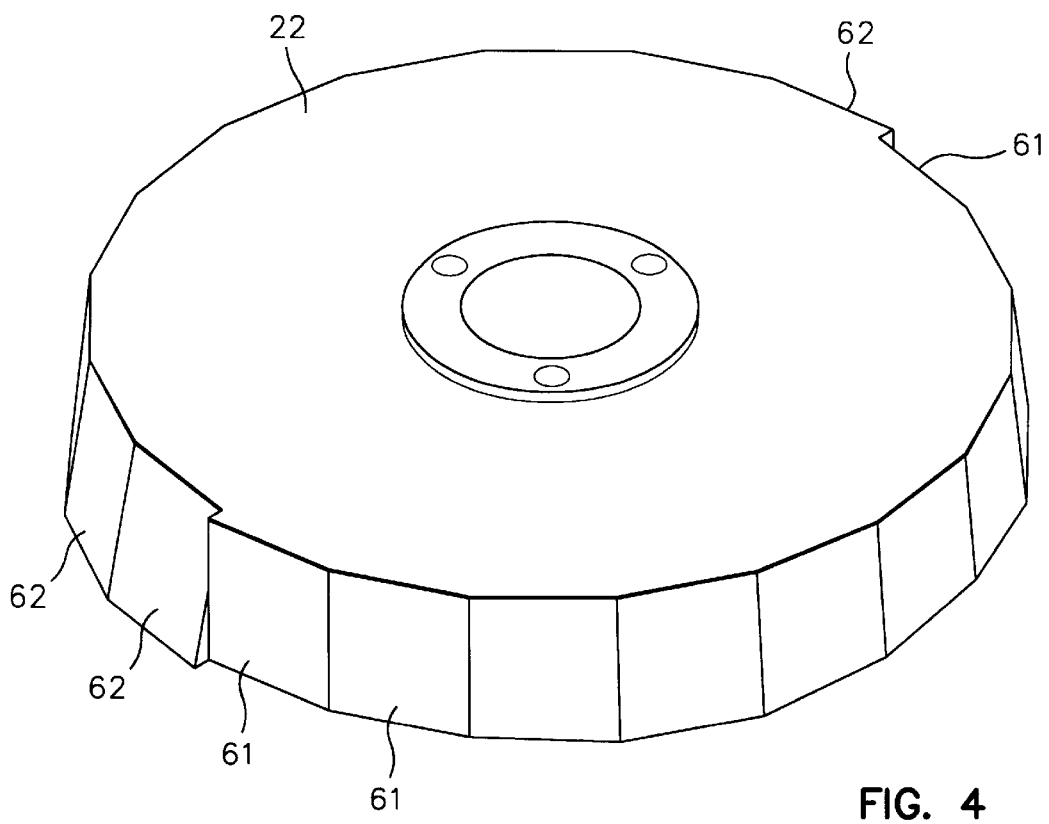
FIG. 4 is a perspective view of a scanning polygon.

The typical tilt-facet polygon scanner 22 which employs a total of twenty facets (two each at ten progressive angles) is illustrated in FIG. 4. The 20-sided scanner can be designed with groups of faces 61 and 62, each group of which exhibits ten discrete pyramidal angles, each specific angle being duplicated on diametrically opposed facets. The facets in the first set of ten are designated 61 and the repeating set of ten are referred to with numeral 62. This configuration allows consecutive facets of the scanner to step the picture by 10 percent of the overall picture height. The radius of the polygon is on the order of 50 mm, while the speed of rotation required to achieve 70 frames per second is 1,200 rpm. For this particular configuration, where each scanner facet 61, 62 has an angle with respect to the vertical which changes by 0.6° from one facet to the next adjacent facet within each grouping of facets, a 180° rotation moves the sweep vertically by 6°. The next rotational group starts at the same vertical position and again moves the sweep 6° with another 180° of rotation. In the meantime, each facet subtends a horizontal angle of about 8°. Of course, with different element parameters, these specific details would change. Polygonal scanning mirrors 22 may be acquired from Lincoln Laser, 234 East Mohave, Phoenix Ariz. 85004.

The imaging lens 24 (shown in FIG. 1) has been designed to use the output of the polygonal scanning mirror 22, which is typically collimated, and to provide an exit pupil that is conjugate with the entrance pupil of projection lens 26. This lens provides a color corrected diagonal field of about 40 degrees in conjunction with an exit pupil which is located approximately 200 mm beyond the image plane. Compound lens arrangements are within the ordinary skill in the art and will not be described in detail here.

Figure 5:
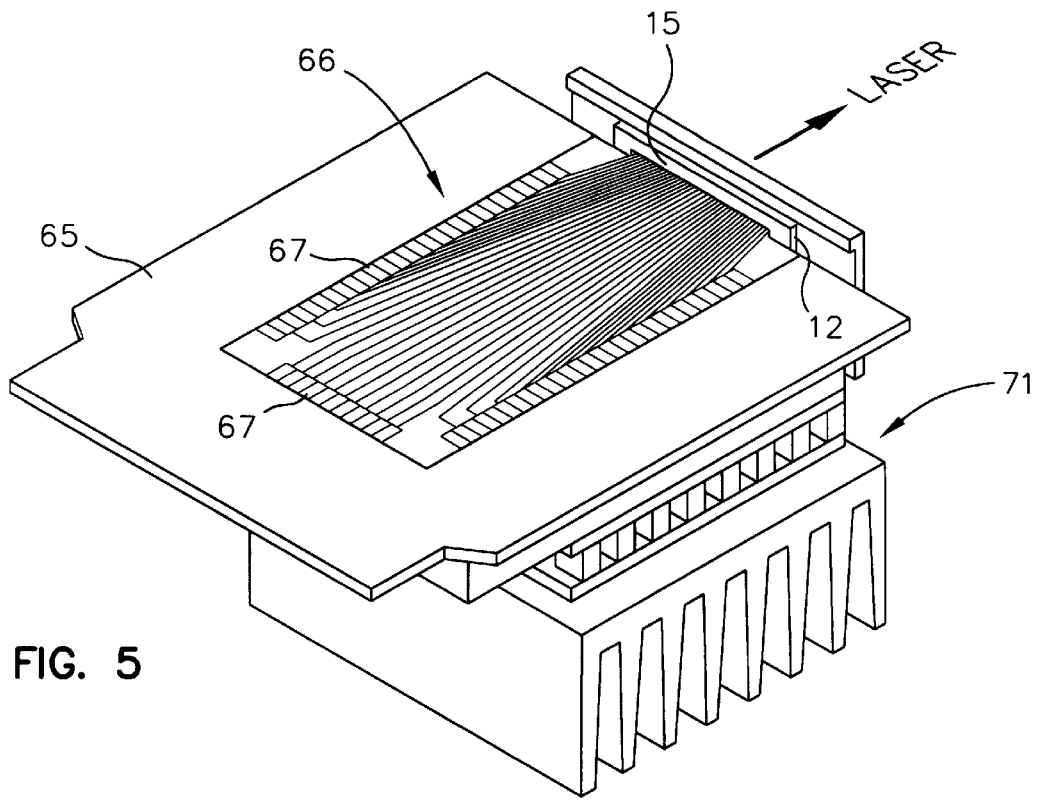
FIG. 5 is a perspective view of a 120-element per centimeter individually addressable microlaser array including a heat sink and a thermoelectric cooler (TEC).

A layout for a 120-element individually addressed microlaser array is shown in FIG. 5. A board 65 has circuitry 66 printed thereon which provides multiple connectors 67 for the video signals to be conducted to laser diode array 15. These diodes pump the microlasers in the array 12 to result in the emission of red output light to the surface 33 of the diachroic prism combiner 31. Mounted to the other side of the board 65 is a heat sink and a thermoelectric cooler (TEC) 71. When three such arrays (providing red, green and blue light beams) are mounted to the combining prism, they are integrated into a projection system which takes the form shown in FIGS. 6 and 7. These views of the system illustrate the three-dimensional relationship between system elements, namely, the microlaser arrays, the combining prism, the relay lens, the scanning polygon mirror, the imaging lens, the speckle elimination device, and the final projection lens.

Also shown in these structural system figures is a projector control card 73 to which the video signals are applied through an input 21, and a diode driver card 74, connected by a cable 75 to the card 73. Cables 76, 77 and 78 connect the respective laser diode/microlaser modules to the driver card 74. A chassis 81 also includes a power supply 82 and auxiliary power supply 83.

When a laser source is used for video image projection, each individual pixel at the screen comprises a large number of scattering sources. The intensity of the signal seen by an observer is the summation of the signals from each of these scattering points. Hence, in the presence of a non-moving monochromatic source and a non-moving screen, the video image is comprised of a complex interference pattern which is called speckle.

Prior laser based projection systems have suffered from this problem of image speckle which is intrinsic to narrow-band laser sources. Such speckle manifests itself as fine grain intensity fluctuations in the viewed image, the specific distribution of fluctuations rearranging itself in a random fashion whenever the viewer's head executes small lateral motions. The visual effects of speckle detract from the aesthetic quality of an image and also result in a reduction of image resolution. Consequently, in the context of high resolution display systems, it is generally deemed essential that speckle be eliminated.

Of the many methods whereby speckle elimination can be effected, four approaches are described briefly below, each of which introduces an optical path randomizing media at an intermediate focal plane within the projection optics. These four randomizing media can be described as: spinning diffusion plates; flowing fluid diffusers; non-flowing fluid diffusers; and nutating diffusion plates.

When a spinning diffusion plate is located at an image plane of the projector system, elimination of speckle effects occurs for transverse plate velocities in excess of a few centimeters per second. Disadvantages associated with such devices involve their transmission inefficiency (~50%), the large numerical aperture of their output, and their general bulkiness. To circumvent the first two disadvantages, one can replace the ground glass surface, a structure previously suggested in the literature, by a thin sheet of wax supported between glass plates. This allows one to increase the forward transmittance of the screen to the 85%–95% regime while, at the same time, retaining high resolution in conjunction with forward scattering cones in the 10°–20° full width at half maximum (FWHM) range.

A flowing fluid diffuser comprises a pair of closely spaced glass plates between which a highly turbid fluid is caused to now. Tests of this concept have been performed with a correction fluid suspension acetone. An example of such a product is "Liquid Paper" (a trademark of The Gillette Company). At modest flow rates, this technique results in complete elimination of speckle. However, it combines low transmission efficiency with the inconvenience of a pump and associated plumbing.

When the particles suspended in a fluid diffuser are sufficiently small in size, speckle is eliminated in the absence of flow. This phenomenon is caused by Brownian motion of the scattering particles. As such, it leads to a simple and compact device which, in the conventional sense, has no moving parts. A disadvantage of this type of speckle eliminator is that its transmission efficiency is limited, compared with what presently appears to be the best available system described below.

Figure 8:
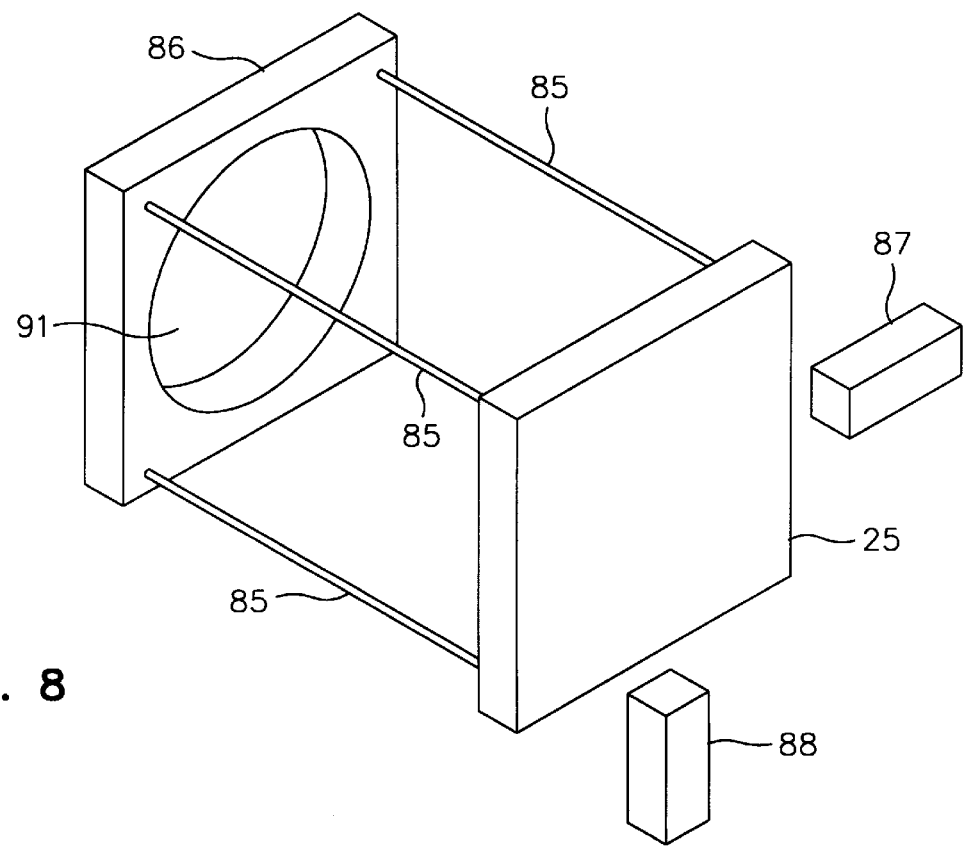
FIG. 8 is a conceptual representation of a speckle eliminator.

Another approach to speckle elimination is a novel nutating diffusion plate configuration. This approach to speckle elimination takes advantage of the desirable properties of wax laminate diffusers (mentioned in connection with spinning diffusers), while packaging the resultant device in a less bulky configuration. A screen with linear dimensions which are slightly greater than the intermediate image within the projection system is employed. The screen is supported on springs, and caused to vibrate in a plane which lies perpendicular to the projection axis of the video image beam. A conceptual example is shown in FIG. 8. A screen 25 is supported by spring elements 85 from an aperture plate 86, which is mounted to the chassis 81. The nutation may be induced in the screen 25 by orthogonal electromagnets 87, 88. The image beam passes through an opening 91 in the plate 86 and then through the speckle eliminator screen 25.

Motion relative to two orthogonal axes is induced in the screen 25, together with a 90-degree phase shift between those motions, in order to avoid periodic moments of zero velocity which would be associated with simple harmonic motion along a single axis. The result is a non-rotating diffuser which undergoes rapid nutation, much in the manner of the contact surface of an orbital sander. Hence, all regions of the image are subjected to the same motion. An excursion of 1 millimeter at 60 Hz provides a constant transverse velocity of about 20 cm sec$^{-1}$. This yields an inexpensive device which is barely larger in cross section than the imaging beam itself.

Figure 9:
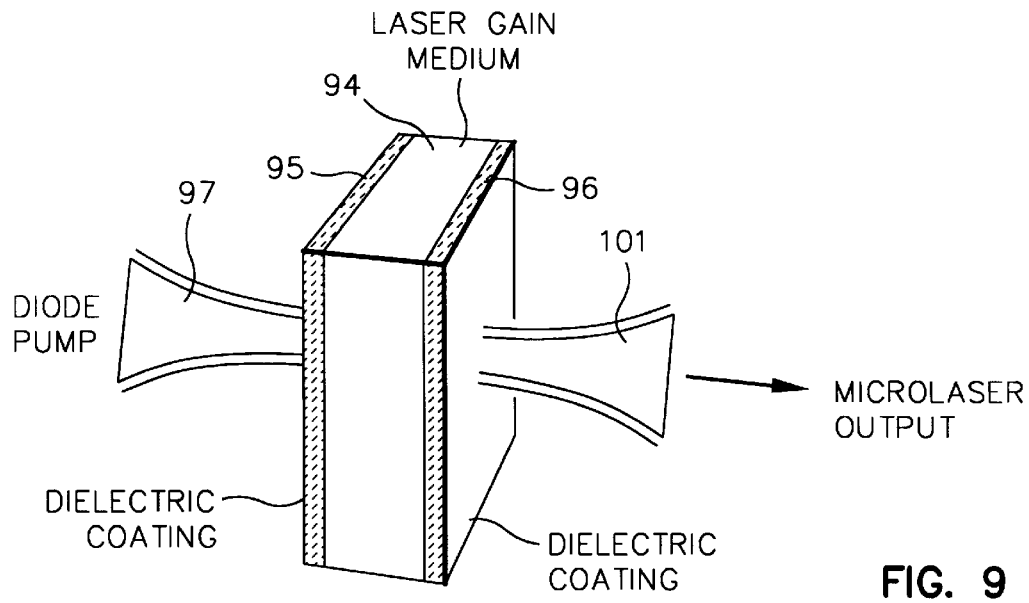
FIG. 9 illustrates a diode laser-pumped microlaser.

Referring to FIG. 9, one type of microlaser suited to image projection typically is fabricated by a polishing wafer 94 of solid-state rare-earth doped gain medium so that two sides of the wafer are flat and parallel. The thickness of the wafer 94 corresponds to the length of the laser cavity, which is typically on the order of 1 mm. Appropriate dielectric coatings 95 and 96 are deposited directly to the polished surfaces to form the mirrors of a two-mirror standing wave cavity.

Near-IR diode lasers, such as AlGaAs quantum well devices, are used to longitudinally pump the microlaser, as indicated by input 97. The diode laser wavelength can be temperature-tuned to a strong absorption band of a rare-earth ion, thus allowing very efficient operation. The planar uniformity of the flat-flat cavity is broken by pump beam 97, which deposits heat as it pumps the crystal. As the heat diffuses outward from the pumped volume, it forms a thermal waveguide that defines the transverse dimensions of the oscillating mode, typically 100–200 $\mu$m in diameter. The output is indicated by reference numeral 101. If smaller mode sizes are required, convex curvatures can be imparted onto the microlaser surfaces.

One of the techniques employed to generate visible light from a microlaser is based on frequency doubling of the near-IR emission of an aluminum galium arsenide (AlGaAs) diode laser pumped neodymium ion (Nd$^{3+}$) doped device. The AlGaAs output is tuned to the 0.809 $\mu$m absorption transition of Nd$^{3+}$, and lasing is achieved at 1.3 $\mu$m, 1.06 $\mu$m, and 0.9 $\mu$m. Using conventional frequency doubling techniques, visible light at 0.65 µm, 0.53 µm, and 0.45 µm is obtained. Thus red, green and blue laser output are achieved. The specific techniques to generate the various colored laser beams are not relevant to this system invention. Suffice it to say that operative techniques are described in the literature and are within the skill in this art. It should be recognized that frequency doubling can be accomplished with a single rare earth doped nonlinear material or with two adjacent materials, such as a rare earth doped crystal in combination with a second nonlinear crystal.

Because an individual microlaser occupies only a small volume within a host wafer and that volume is pumped along an axis which lies perpendicular to the plane of the wafer, it becomes a simple matter to incorporate an array of microlasers within a single wafer. In this regard, array geometries of microlasers are limited only by characteristics of the pump diode laser arrays and by the transverse mode dimensions mentioned above.

One approach for fabrication of microlaser arrays is to polish a slab or sheet of gain material flat and parallel with etalon parallelism tolerances. This slab is butt-coupled to a diode laser array, with laser action occurring at the positions of each diode laser pump. However, in a flat-flat microlaser slab the smallest spot size, and hence the minimum center-to-center spacing of individual microlaser elements, is limited by thermal diffusion and by the size of the resultant thermally induced index-waveguide. Even when the diode pump spots are extremely small, the thermal waveguide effect limits the spot size and center-to-center spacing to ~100 µm. This corresponds to 100 emitters/cm which is borderline for the HDTV requirements but this approach could work in the system of this invention.

Figure 10:
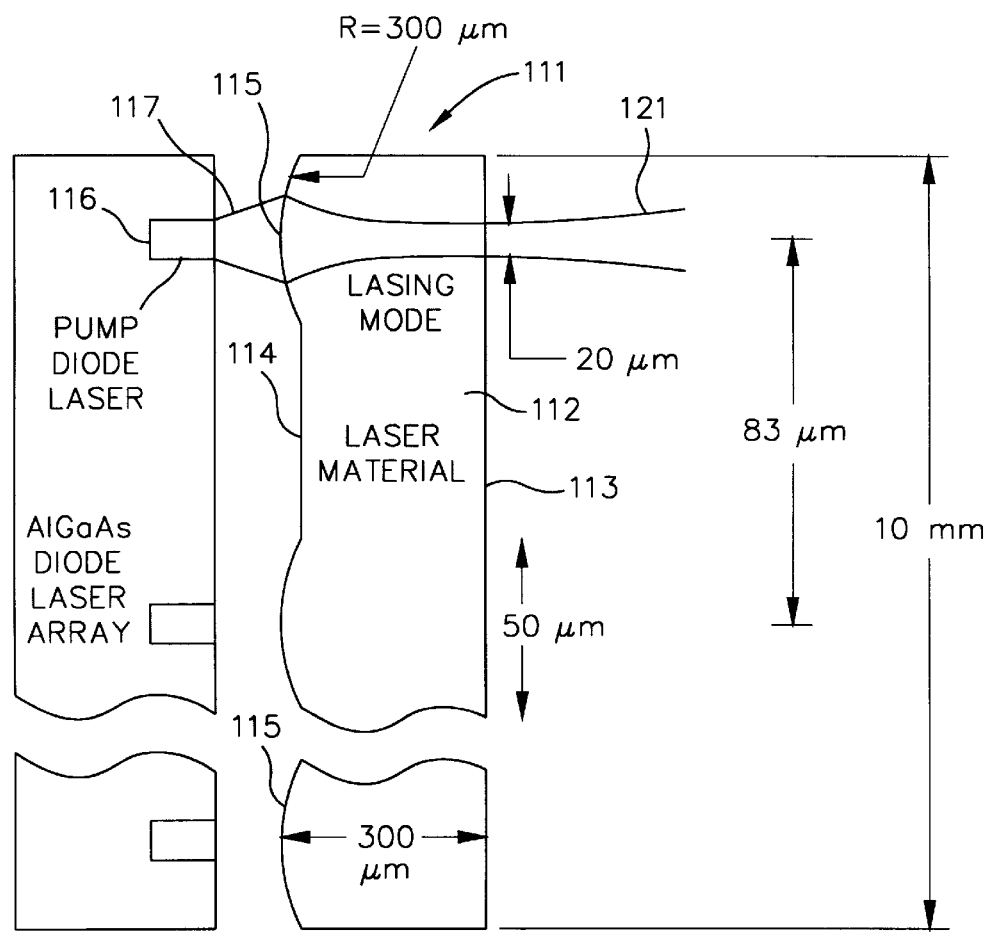
FIG. 10 is a conceptual diagram of a 120-element pumped microlaser array.

To achieve higher density microlaser arrays, the surfaces of the material can be modified such that the microlaser mode size is determined by surface curvatures and not by the pump-induced thermal waveguide effect. To attain a center-to-center emitter spacing of <100 µm and prevent crosstalk, the single element microlaser cavity design should be chosen to give a transverse mode diameter on the order of 20 µm. For a microlaser material with a typical index of refraction of 1.8, a 20 µm mode diameter is achieved with a confocal resonator of length 300 µm (a confocal resonator requires convex surface/mirror radii of curvatures equal to the cavity length). Convex surfaces, as shown in FIG. 10, reduce the lasing threshold. Indexes of refraction are different for different lasing materials, but that information is readily available as needed.

Individually addressed diode laser arrays have been produced with 83 µm center-to-center spacing with ~100 mW output per emitter. Each element within the array is a single mode diode laser with an output aperture of 1×20 µm and an emission bandwidth of less than 1 nm at output wavelengths of about 0.809 µm. These characteristics are well suited for pumping $Nd^{3+}$ doped microlasers. Also, such devices have been tested to 1 MHz amplitude modulation bandwidth with no sign of optical cross-talk between adjacent emitters.

As new visible heterostructure diode lasers become available, such as AlGaInP operating at red wavelengths, and II–VI diode lasers, such as CdZnSe and AlGaInN operating at green and blue wavelengths, these elements can be employed in this system in place of the microlasers discussed above.

The particular configuration of FIG. 10 is provided as an example only. A sheet 111 of laser material 112, which as stated previously, may be a unitary or a compound sheet, includes flat side 113 which is polished and coated with a suitable dielectric as discussed above. Opposite a side 114 is formed with a multiple convex protrusions 115, each of which defines an individual microlaser. That surface, or at least the convex areas, are polished and coated with the appropriate dielectric material. As shown, the diameter of the protrusions 115 on the surface 114 is about 50 µm. A diode laser pump element 116 is aligned with each convex surface 115. Each diode laser is individually modulated in intensity so that it pumps its associated microlaser with 0.809 µm energy 117, causing lasing action, and the appropriate wavelength output 121 (red, green or blue) at the appropriate image intensity is emitted. The laser light so emitted is operated on as previously discussed in connection with the description of the system.

In one embodiment there are 120 microlasers within the laser material strip of 10 mm in length. The center-to-center spacing between adjacent microlaser elements is in the range of 83 µm. It could be less, depending on the configuration of the elements of the system, even as small or smaller than about 25 µm spacing. The thickness of the strip or the sheet 111 is on the order of 300 µm and the radius of curvature of each convex protrusion 115 is also on the order of at least 300 µm. This relationship, where the radius of curvature is at least equal to the length of the cavity, can be maintained to ensure small laser modes and stable laser action. As each microlaser is pumped, it emits a beam of approximately 20 µm diameter. This set of parameters is by way of example only.

Another embodiment of the laser/modulator array module is shown in FIGS. 11, 12 and 12A. FIG. 12 is quite similar to FIG. 1, with the addition of a linear array spatial light modulator 131 of FIG. 11. As an example, the microlaser array employs spatial light modulators. One suitable spatial light modulator is based upon the ceramic electro-optic material lead lanthanum zirconate titanate (PLZT). This material has been employed in light modulator applications such as for flash blindness goggles. Since the material is a ceramic, the fabrication technology is well developed so high yield, low cost devices can be realized. One embodiment of the invention employs uses a PLZT modulator with a 9.0/65/35 composition (9% lanthanum and a 65:35 ratio of zirconate/titanate). The dimensions of one embodiment of a PLZT device measures 150 µm in thickness by 1 mm in length and 27 mm in width to produce 64 linear array elements.

With the proper composition, PLZT exhibits a large, fast electro-optic effect in the absence of a piezo-electric effect. A PLZT compositional range between 8.8 and 9.65 percent lanthanum, with the remainder being a 65:35 ratio of lead zirconate to lead titanate respectively, exhibits a large, fast, quadratic electro-optic effect in the absence of a piezo-electric effect. Further, this material displays high transmission per unit length (~95%/mm) in the spectral region extending from ~450 nm to ~670 nm, the region of interest here. This composition has 9% lanthanum and the remainder is a 65:35 ratio mixture of lead zirconate and lead titanate, respectively. This is a non-ferroelectric state of PLZT, having a piezo-electric coefficient of zero. There are some PLZT compositions which exhibit a piezo-electro effect and they may not be suitable for this application.

The linear array spatial light modulator 131 shown in FIG. 11 may be made with the following characteristics, listed here only as an example. Thickness 133 of a wafer 132 is 0.15 mm, its width 134 is 1 mm, and its length 135 is 27 mm. This wafer has 128 Cr/Au electrodes 136 which are 50 µm wide, with the pitch between electrodes of 250 µm. Photo-etched masks can be designed to allow for Cr/Au electrode patterns to be deposited directly onto the fabricated PLZT material. The use of masks in the deposition process eliminates the need for additional photo- or chemical etching steps while still allowing for high packing densities in a transverse configuration. The electrodes are deposited on one side of the wafer and a ground plane 137 is deposited on the other side. Appropriate wire bonding techniques may be employed to connect electrical signals to each electrode.

Injected microlaser beams 141 from each microlaser element in an array, such as array 152, are 50 µm in diameter and their input polarizations are oriented at 45° to the applied electric field. To ensure 45° polarization of the laser beams from any microlaser array, it may be necessary to interpose a wave plate or a phase retarder 138 (shown in FIG. 12A) between a microlaser array and modulator 132. In one embodiment of the invention, the red and blue microlaser outputs need phase retarders to achieve 45° polarization, while the green output is already polarized at 45°. A polarization analyzer 142 is bonded to the output side of the modulator wafer 132 and its polarization at zero modulation voltage is oriented at 90° relative to the input polarization. Under these conditions, when no modulation voltage is applied to the electrodes 136 there is no light output from the microlaser array module. With the module dimensions given above, and the known electro-optic coefficients of PLZT, the half wave voltage (voltage required for intensity modulation from full ON to full OFF) is ~70 V. It can be advantageous to alternatively drive the PLZT modulator elements alternatively in the positive and then the negative direction to avoid a build up of charge in the elements, for example to +70 V (full ON) and −70 V (also full ON) rather than repeatedly driving the elements to +70 V.

By applying a video signal voltage, entering through a cable 158 to a specific electrode, the polarization of the respective microlaser beamlet is rotated, resulting in polarization modulation in the wafer 132 of the video voltage signal. The output of the module from the analyzer 142, is then amplitude modulated. Thus the microlaser array beams are simultaneously adjusted in amplitude by changing the voltages amplitudes applied to the electrodes 136 on each wafer 132.

For completeness, the other image projection system elements will be called out. The differences between FIG. 12 and FIG. 1 are in the microlaser array module 151 and its external connections. In place of current driver video input 21, which directly modulated each laser pumping diode in arrays 15, 16 and 17 in FIG. 1, input cable 161 is a power connection only. In this embodiment, all of the pumping diodes in arrays 155, 156 and 157 are on continuously, thereby continuously energizing each microlaser element in arrays 152, 153 and 154. A voltage driven video input signal is employed in the FIG. 12 embodiment, referred to generally by reference numeral 151. In FIG. 12A, a cable 158 is seen to be comprised of many wires 159, one connected to each electrode 136 on the wafer 132. An external ground connection is made to a ground plane 137 by a wire 139. Alternatively, individual ground connections are made to electrodes 136 by conventional wire bonding.

The output beams from the module 151, fully modulated as they were from module 11 in FIG. 1, are then combined by such means as combiner 171, possibly the dichroic prism shown in FIG. 3. The laser beams then proceed through relay lens 163, are scanned as previously described by scanner 162, pass through an imaging lens 164, a speckle eliminator 165, a projection lens 166 and finally onto projection screen 167.

It should be noted that the modulation apparatus in the FIG. 1 embodiment comprises the video or image input 21 and the laser diodes 15, 16 and 17. The modulation apparatus in the FIG. 12 embodiment comprises the image input 158, the wires 159, the wafer 132, and the electrodes 136. Similarly, the red, green and blue laser elements of FIG. 1 are individually addressed in the manner that they are excited or energized by the modulation means. In the FIG. 12 embodiment, the laser elements are continuously excited and it is the output beams that are individually addressed and modulated.

Figure 6:
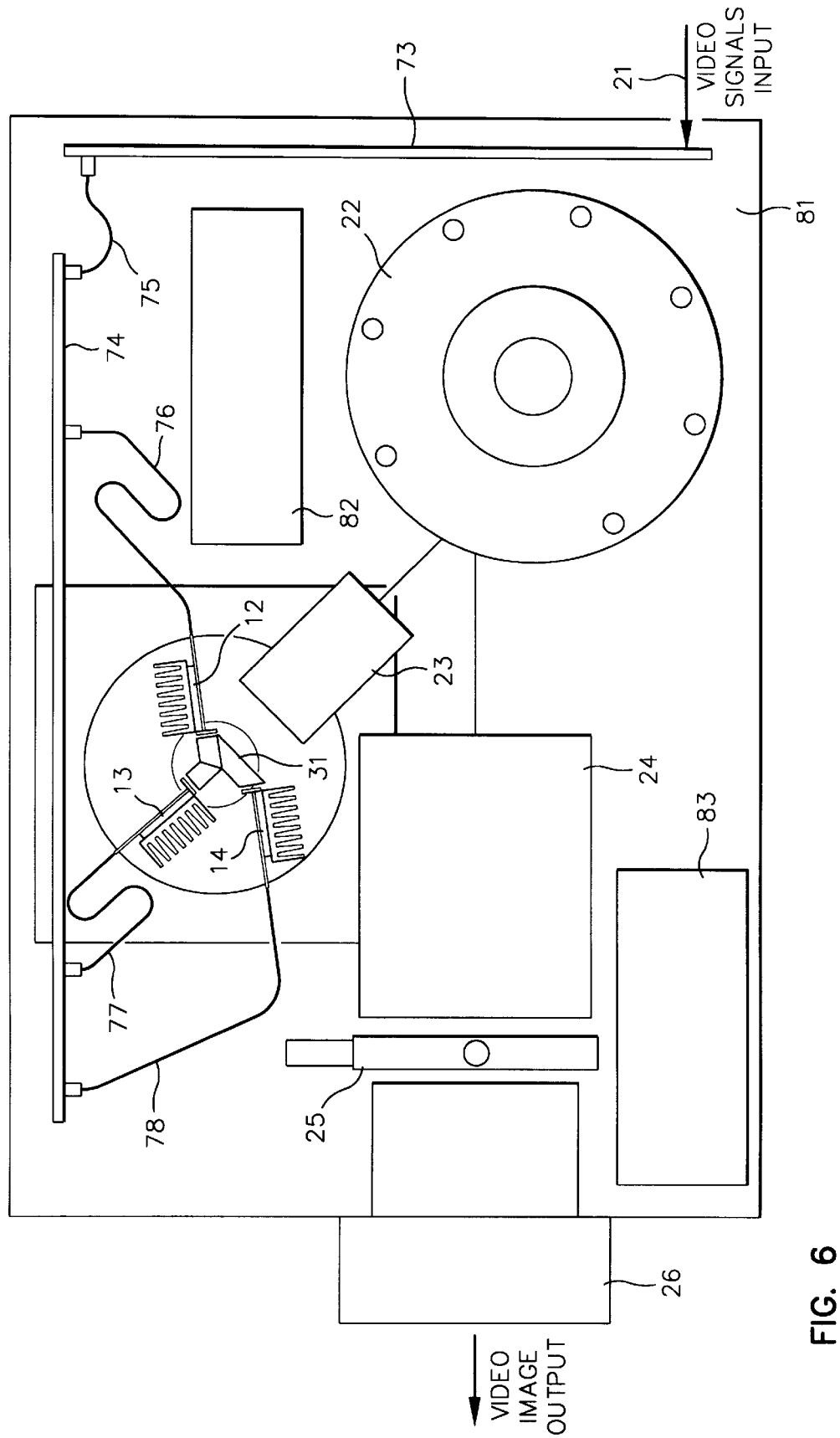
FIG. 6 is a plan view of a microlaser array projection system.
Figure 7:
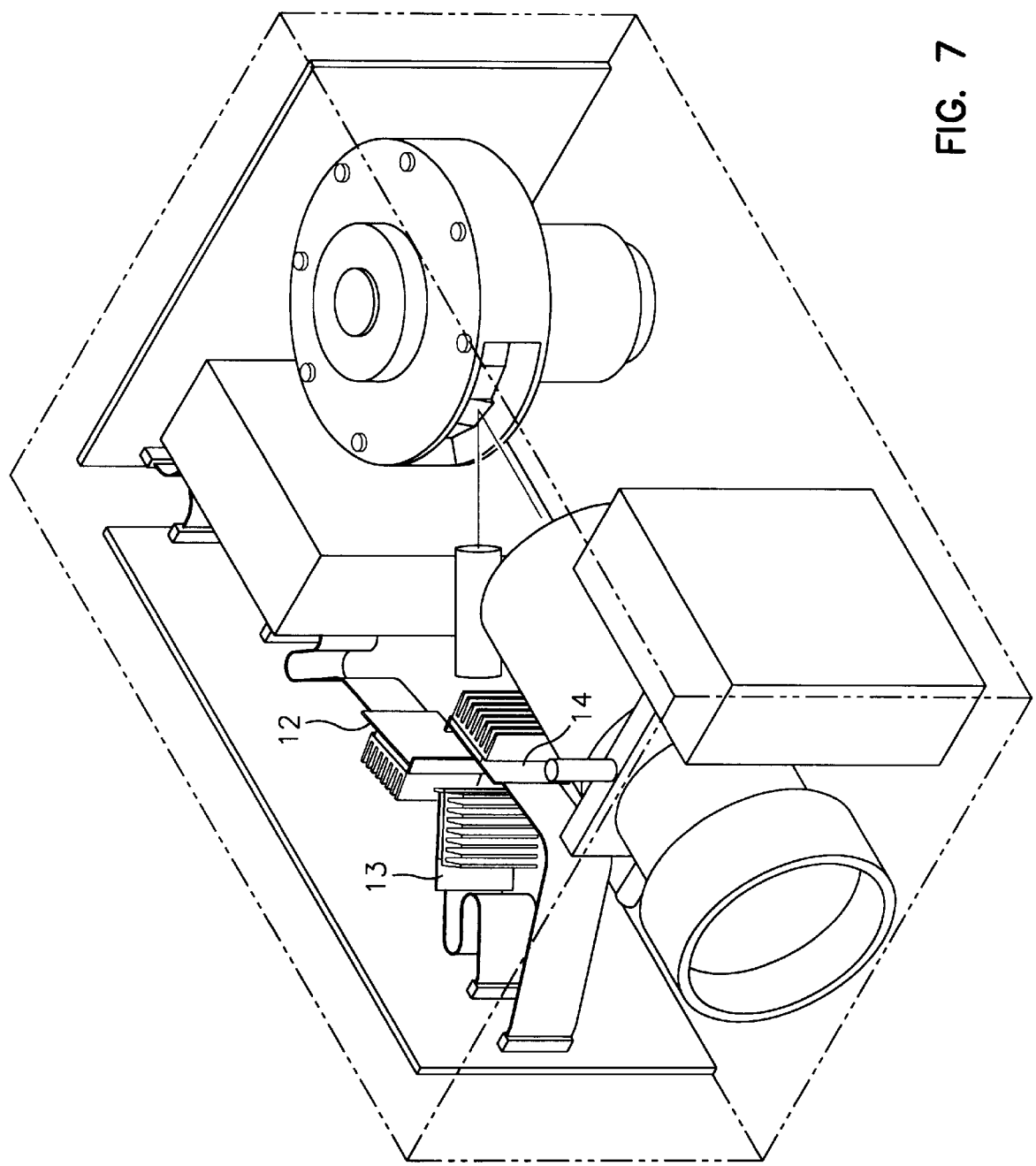
FIG. 7 is a perspective view of the system of FIG. 6.

The combining element is shown as the dichroic prism 31, but other structures could be devised to accomplish the same result. The unitary microlaser block 11 shown in FIG. 1 may be made in separate spaced elements as shown in FIGS. 6 and 7. A different combiner would likely result in a different physical arrangement of the microlaser arrays and, of course, the mating spatial light modulators of FIG. 12.

Figure 13:
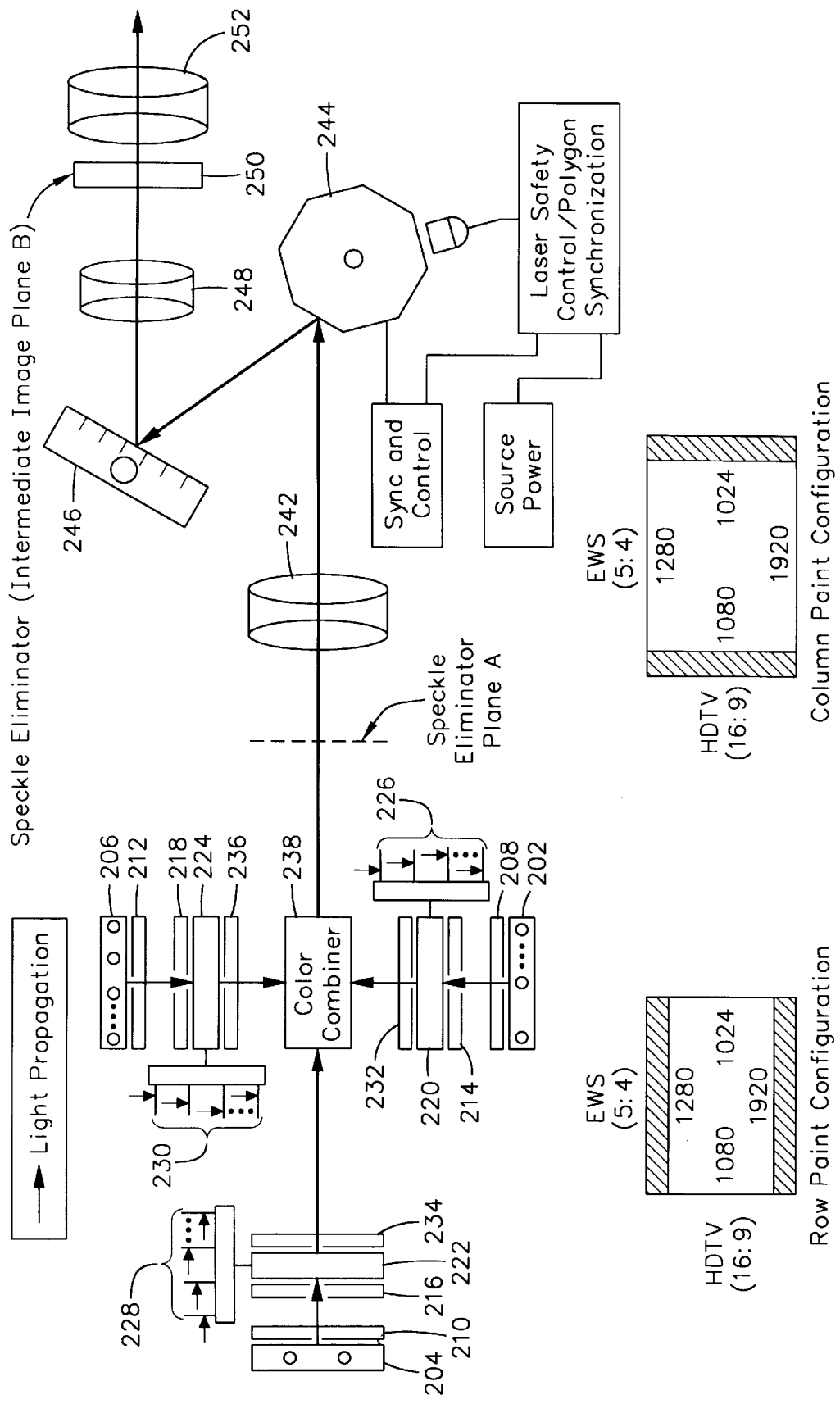
FIG. 13 is a block diagram illustrating an embodiment of the components of another imaging system.

FIG. 13 is a block diagram illustrating a display system using three laser light sources. The system includes blue, green, and red laser light sources 202, 204 and 206, respectively. Alternatively, other members of laser light sources and other spectra may be used. Each laser light source has a light shaping device 208, 210, 212 which receives the laser light from the laser light source and shapes it into the required line of light which is received by the associated microlens arrays 214, 216, 218. The microlens arrays convert the received line of light into a specified number of approximately identical beamlets. The beamlets are then treated in a manner similar to that described for the arrays of lasers in the systems depicted in FIGS. 1 and 12.

The beamlets are received by modulators 220, 222, 224, which are capable of separately modulating each individual beamlet in response to an input control signal 226, 228, 230. Three lenses 232, 234, 236 then direct the respective beamlets into the color combiner 238 which can be of the type of combiners described above with regard to FIG. 1, element 31 and FIG. 12, element 171. The filed lens, one for the blue source, one for the green source, and one for the red source, work in combination with the collimating lens 306 to form a pupil on a polygon scanner 246. Because the color sources are not in a common beam path, the field lens also may provide for correction of chromatic aberrations.

The combiner 238 functions to precisely register each of the individual red, green, and blue beamlets with each other in the same manner as was described with reference to the individual microlaser array outputs with regard to FIGS. 1, 3, 6, and 7 above. The combining results in an output of beamlets, each of which comprises three input beamlets of each of the colors red, green, and blue. The combined beamlets are then passed through a collimator lens 242 to collimate the beamlets.

The collimator lens 242 directs the beamlets to the polygon scanner 244 which operates to scan the beamlets in a single dimension. The polygon scanner 244 has identical facets which are aligned vertically. The scanned beamlets are then directed to a second scanning apparatus 246 which scans the beamlets in a second dimension. For example, the polygon scanner 244 can be used to scan the beamlets in a horizontal or row direction while the second scanning apparatus 246 is used to scan the beams in a vertical or column direction. The second scanning apparatus 246 can be in the form of a galvanometer or a feedback piezo-actuator. The galvanometer may be of the type sold by Cambridge Technology, Inc., 23 Elm Street, Watertown, Mass. 02172. The beamlets then pass through a reimager 248. The reimager 248 focuses the collimated beam from the second scanning apparatus 246 to form an intermediate image. A speckle eliminator 250 is located at the image plane (intermediate image) formed by the reimager 248. Finally, the beamlets pass through projection optics 252 which relay and magnify this image onto a viewing screen (not shown).

The system can be used with a viewing screen that is configured for either rear or front projection. A rear projection screen is partially transmissive and disperses the light in a forward direction. The image is then viewed from the side of the screen opposite the projector. A front projection screen reflects the projected light and disperses it back toward the projector. The front projection screen is viewed from the side of the screen that the projector is located.

Figure 14:
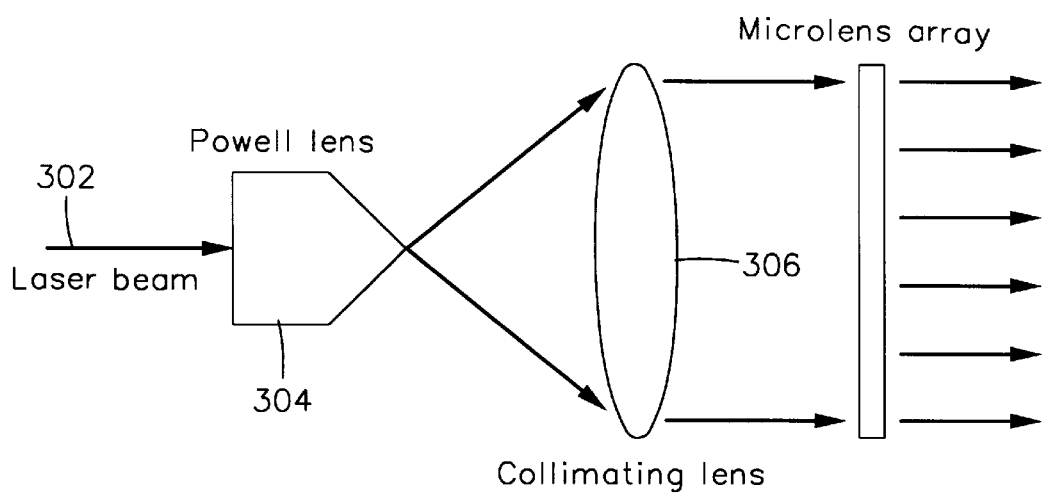
FIG. 14 is a block diagram illustrating a light shaping device.

Turning now to FIG. 14, a more detailed description of an embodiment of the light shaping devices 208, 210, 212 is provided. An incident laser beam 302 (such as from the blue, green, or red microlaser sources 202, 204, 206) is directed to a Powell lens 304. One example of a Powell lens is manufactured by Lasiris which is located at 2549 Ashby Street, St-Laurent, Quebec Canada HR4 2K3. The Powell lens 304 is a one-piece BK-7 glass lens with an aspheric tip which generates a line of light. The dimensions of the line generated vary in length when viewed from different distances from the Powell lens 304 and in one embodiment, has a fan angle of approximately 20°. With any incident beam profile, the resulting beam fan from the Powell lens 304 is a semi-flat top along the length of the line and has the same beam profile along its width. The line is received by a collimating lens 306. The collimating lens may be a system of lenses which collimate the line in preparation for sampling by the microlens array 214, 216, 218.

The microlens arrays 214, 216, and 218 may be molded acrylic microlenses such as are available from Adaptive Optics Associates, located at 54 Cambridge Park Drive, Cambridge, Mass. 02148. In one embodiment, the microlens array has three rows with each row having sixty-six lens elements which can create a total of 198 beamlets. In one embodiment, only one of the rows of lens elements is utilized and only sixty-four of the produced beamlets are used. There are numerous variations of numbers of rows and lens elements that may be utilized.

Figure 15:
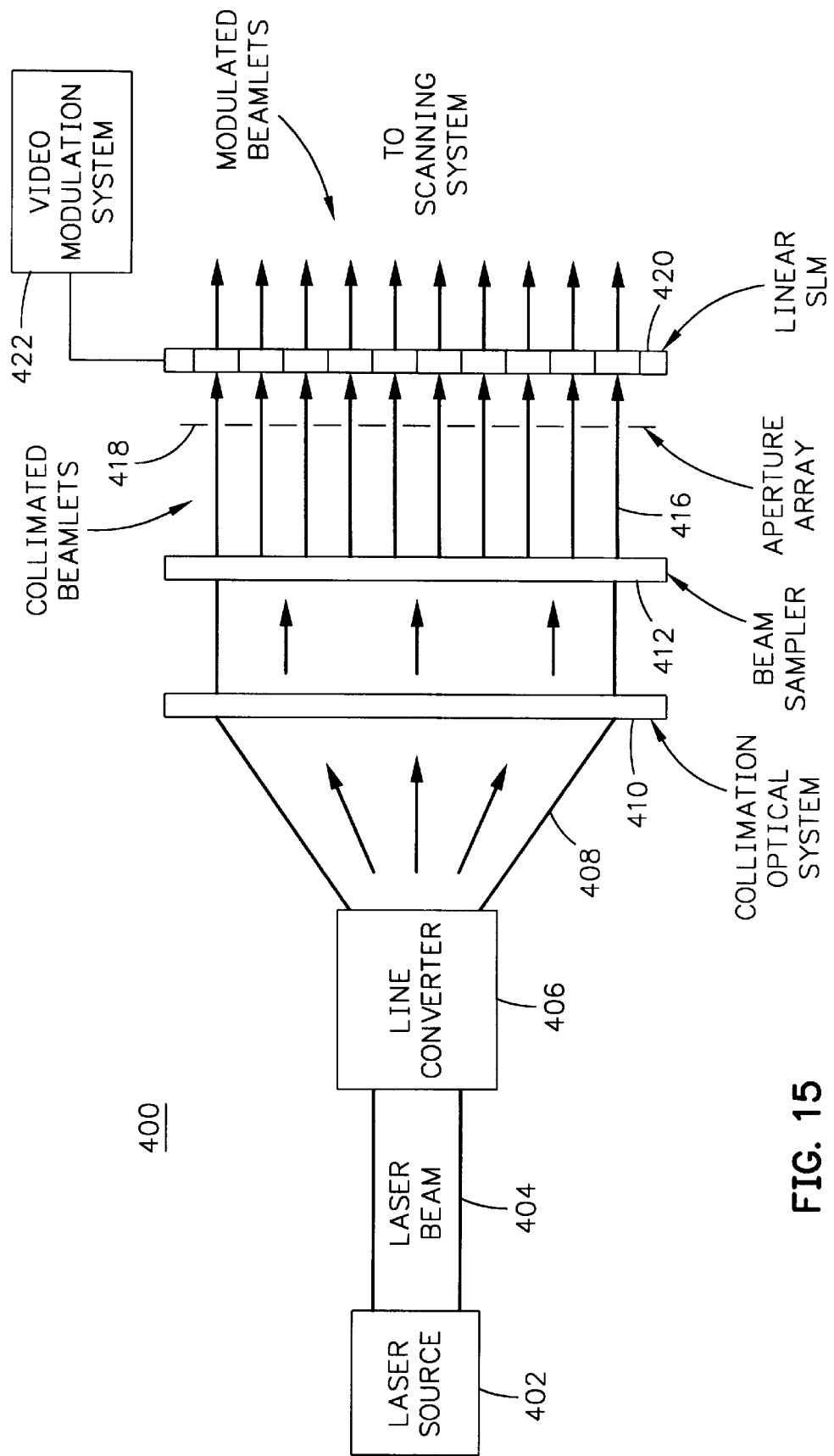
FIG. 15 is a block diagram showing the aspects of the display system which are applied to each single color laser source in the system depicted in FIG. 13.

FIG. 15 is a conceptual block diagram showing aspects of the display system depicted in FIG. 13 which are applied to each single color laser source (e.g. sources 202, 204 and 206 of FIG. 13) in the system. The laser source 402 is generally a source of optical radiation. The radiation may be of the red, blue, or green spectrum or others colors, including infrared, could be utilized for particular applications. Generally, the aspects of the projection system depicted in FIG. 15 are referred to as the beam shaping device 400. Typically, separate beam shaping devices are utilized for each color in this system, i.e., red, green, and blue for the system depicted in FIG. 13. Additionally, multiple laser beams from multiple sources, such as sources with the same wavelength, may be combined into a single laser beam 404.

A line converter 406 converts the laser beam into a line of radiation 408. The line converter 406 can be in the form of a Powell lens, a holographic optical element, a defractive optical element, or other lens systems. The line of radiation 408 is then collimated by a collimating optical system 410. The collimated light is directed to a beam sampler which divides the collimated line of optical radiation into a plurality of beamlets 416. One embodiment of the beam sampler is a microlens array as was described above. An aperture array 418 may be included to more clearly define the beamlets. The beamlets are received by a linear spatial light modulator ("SLM") array 420. The SLM array 420 includes a plurality of modulator elements, and can include a modulator element for each beamlet. The modulator elements are responsive to a control signal such as a video signal for modulating each of the beamlets. The SLM array can include be a PLZT modulator as described above. However, any suitable light modulator can be used such as grating light valves or ferroelectric liquid crystal modulator arrays. A video modulation system 422 receives video or control signals representative of a predetermined image in a video or other format. The video modulation system then supplies the signals that control the modulation of the SLM in accordance with video or control signals and the scanning format of the system.

Direct analog modulation of the PLZT device can be utilized. Alternatively, Gray scale rendering can be achieved using the PLZT modulator described above by using a pulse width modulation (PWM) technique, in which the varying spatial width of each pixel on the screen is integrated by the human eye and is perceived as varying levels of intensity. This is achieved by driving the PLZT device to its full intensity at each pixel and varying the time width of each pulse to obtain the desired intensity effect. One system to drive the PLZT device utilizes a video memory board and interface boards that provide the modulation signals for the PLZT device drivers. For example, the video memory board can be configured to receive 8-bit serial video data and convert it into parallel data in the required readout format. This data is then passed to the interface board which converts this information into the pulse width modulation (PWM) signals. At this point, the data from the interface board is a TEL-level PWM format that is passed to the PLZT device driver electronics which provides the required voltage levels needed to drive the PLZT device. The PLZT device drivers can, for example, consist of a bank of amplifiers, such as those which were originally designed to drive CRTs.

FIGS. 16–29 illustrate various methods ("formats") for scanning an image onto a display screen. In the scanning operation, the modulated beamlets are applied in parallel to the display screen. An image is created when all of the lines in the frame are written. The scanning of the beamlets is effected by, for example, the scanning polygon 22 in the system described in connection with FIG. 1 and by the combined effects of the scanning polygon 244 and the second scanning apparatus 246 in the system described in connection with FIG. 13. The number of modulated beamlets applied in parallel to the screen can range from two up to an extremely large number in excess of 200 depending upon the characteristics required of the system. For purposes of description, a frame can be subdivided into bands. A band is defined as a group of adjacent lines. Lines in multiple bands can be written simultaneously. The time necessary to write every line in a single frame is termed a "frame period". The time necessary to write a single line within a band is termed a "line period". Though each FIGS. 16–29 depicts specific numbers of lines per band, these numbers can be varied depending on system requirements and they are presented here only as example.

Figure 16:
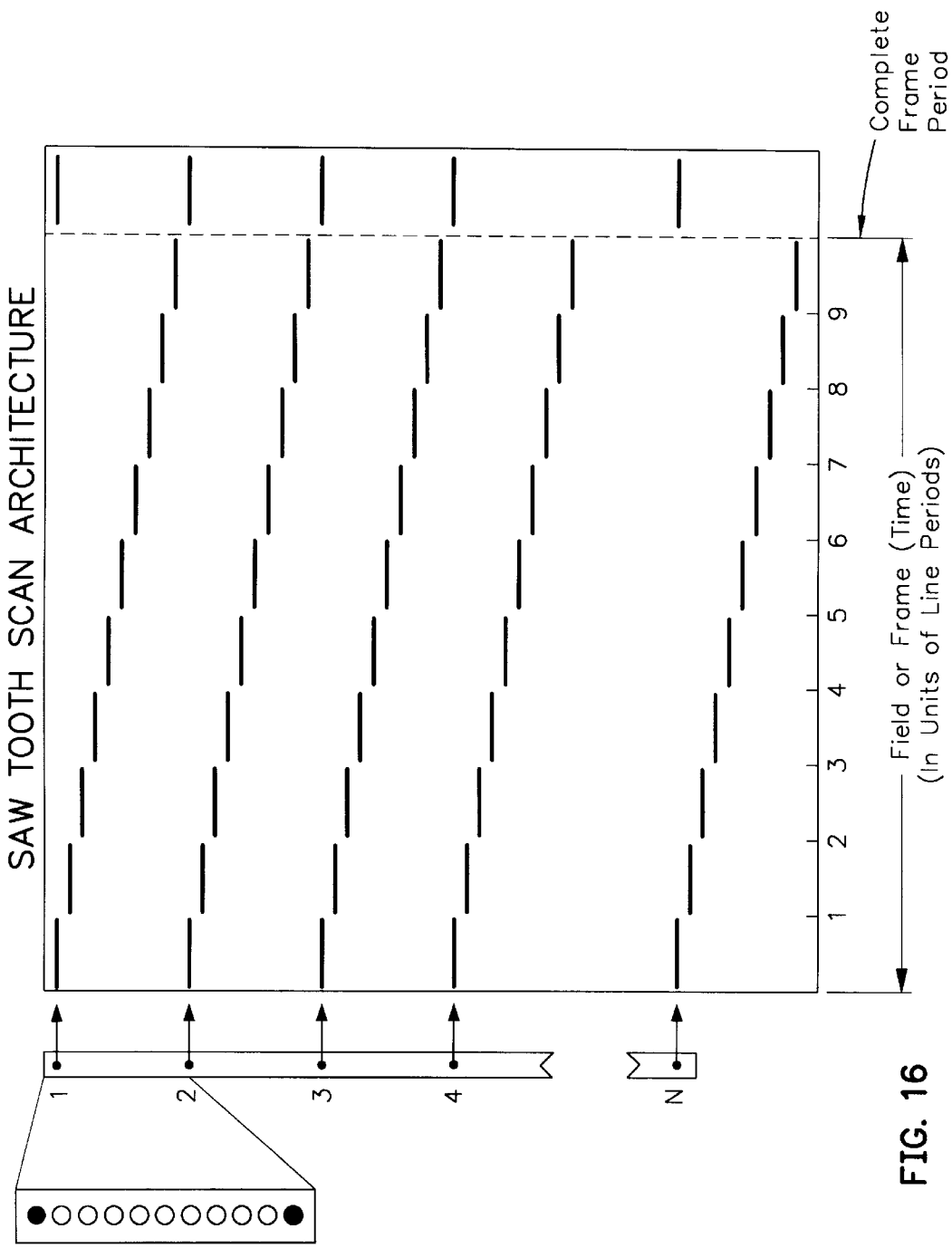
FIG. 16 illustrates a saw tooth image scanning format.

FIG. 16 represents a saw tooth format wherein the lines within each band are written sequentially in order from top to bottom. In other words, a first line in every band is simultaneously written, then the second line in every band is simultaneously written and so on until all of the lines in the bands have been written which completes a single frame. This scanning process proceeds in parallel for each of the bands being scanned. In FIGS. 16–19 the scale along the horizontal axis is in terms of line periods and the numbering along the vertical axis defines the bands. The representation in the upper left corner of the FIGS. 16–19 indicates that each of the bands contains ten lines with the first darkened dot representing the first line of the first band and the second darkened dot representing the first line of the second band.

The simple saw tooth format described above with reference to FIG. 16 can lead to unacceptably high levels of flicker and various image artifacts or defects. Some of the more common image artifacts are the "waterfall effect" (an artifact that scrolls down, up or across the display), "image banding" (bright or dark bands within the image), "flicker" (on an off variations as a function of time within the image), "color image artifacts" (non-uniform color as a result of banding or any other non-uniformity), "speckle" (image artifacts due to laser interference that appear as spots or speckles on the screen), "image pattern noise" (patterns or structure in the image due to variations in intensity as a function of time), "bow-tie distortion" (geometric distortion of an image on the screen from the center to the edge of the screen), and non-linear image formation artifacts appearing from the center to the edge due to non-linear scanner reflection. Though the underlying cause of many of these image artifacts are due to imperfections in specific elements of the system, many of them can be eliminated or minimized to an acceptable level through the use of various scanning methods.

Figure 17:
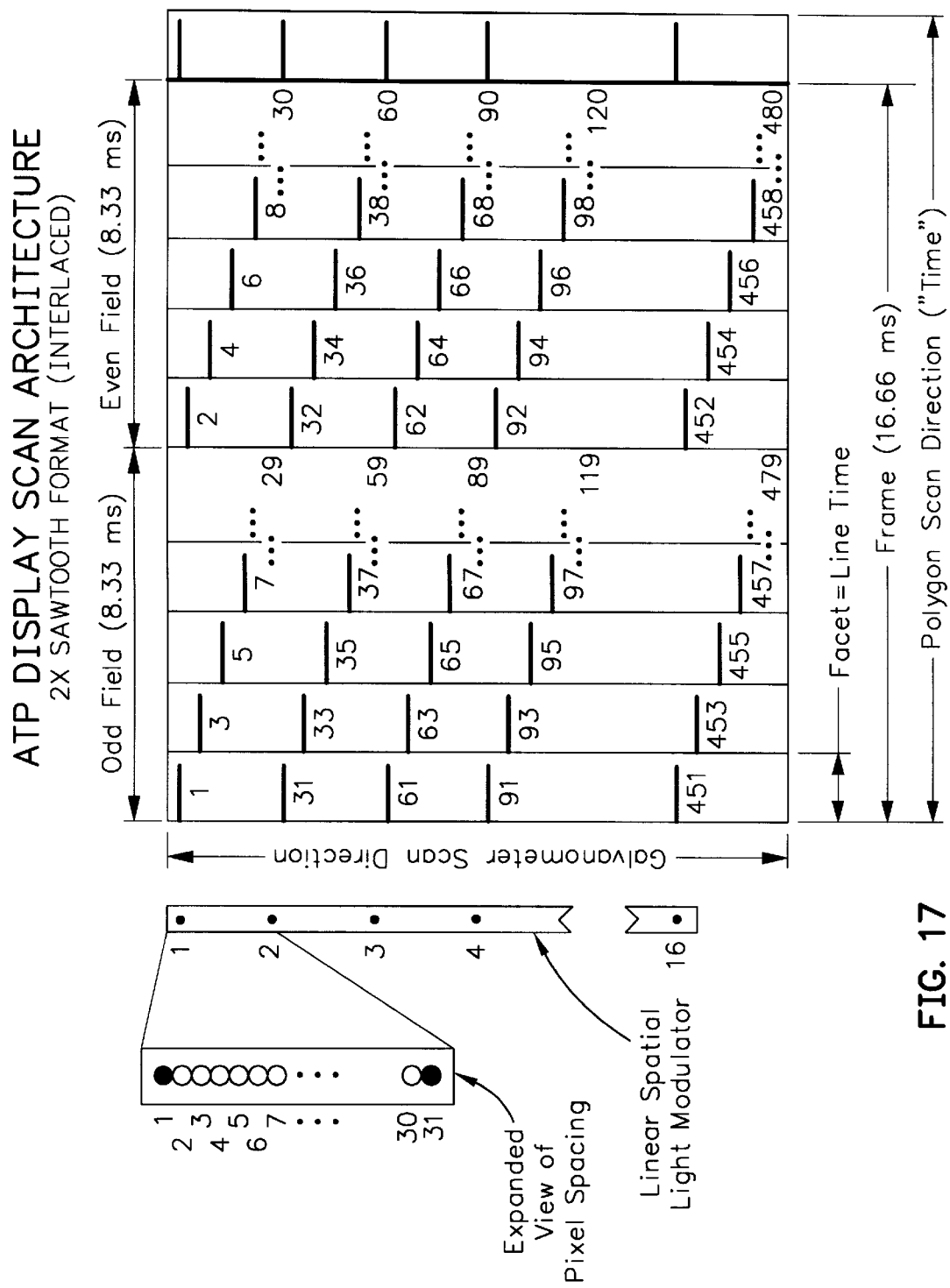
FIG. 17 illustrates a 2X saw tooth interlaced image scanning format.

FIG. 17 represents a 2X saw tooth interlaced format. In this format, the odd lines in each band are written sequentially beginning at the top of the band (first line) during the first half of the frame. The scanned beam then returns to the top of each band and writes the even lines sequentially beginning at the top during the second half of the frame. The process then repeats for each frame. In the format depicted in FIG. 17, the display includes 480 lines divided into sixteen bands of thirty lines each. Each frame equals (is written in) 16.66 milliseconds. As indicated in FIG. 17, the second scanning apparatus 246 controls which line is being written while the line period is controlled by the scanning polygon 244. Of course, different numbers of bands, lines, and frame periods can be utilized. Additionally, the 2X saw tooth format can be straightforwardly expanded to 3X, 4X or beyond. An example describing the beamlet writing progression is described below with reference to FIG. 21.

FIG. 18 illustrates a triangular scan format. In the triangular scan format, the odd lines in each band are written from the top (line 1) sequentially in the first half of the frame period, and the even lines are written from the bottom line (line 10) in an ascending order to the top of the screen in a second half of the frame period. The scan direction may be easily reversed, and the even lines can be scanned before the odd lines. The format depicted in FIG. 18 has n bands with each band having ten lines.

Figure 19:
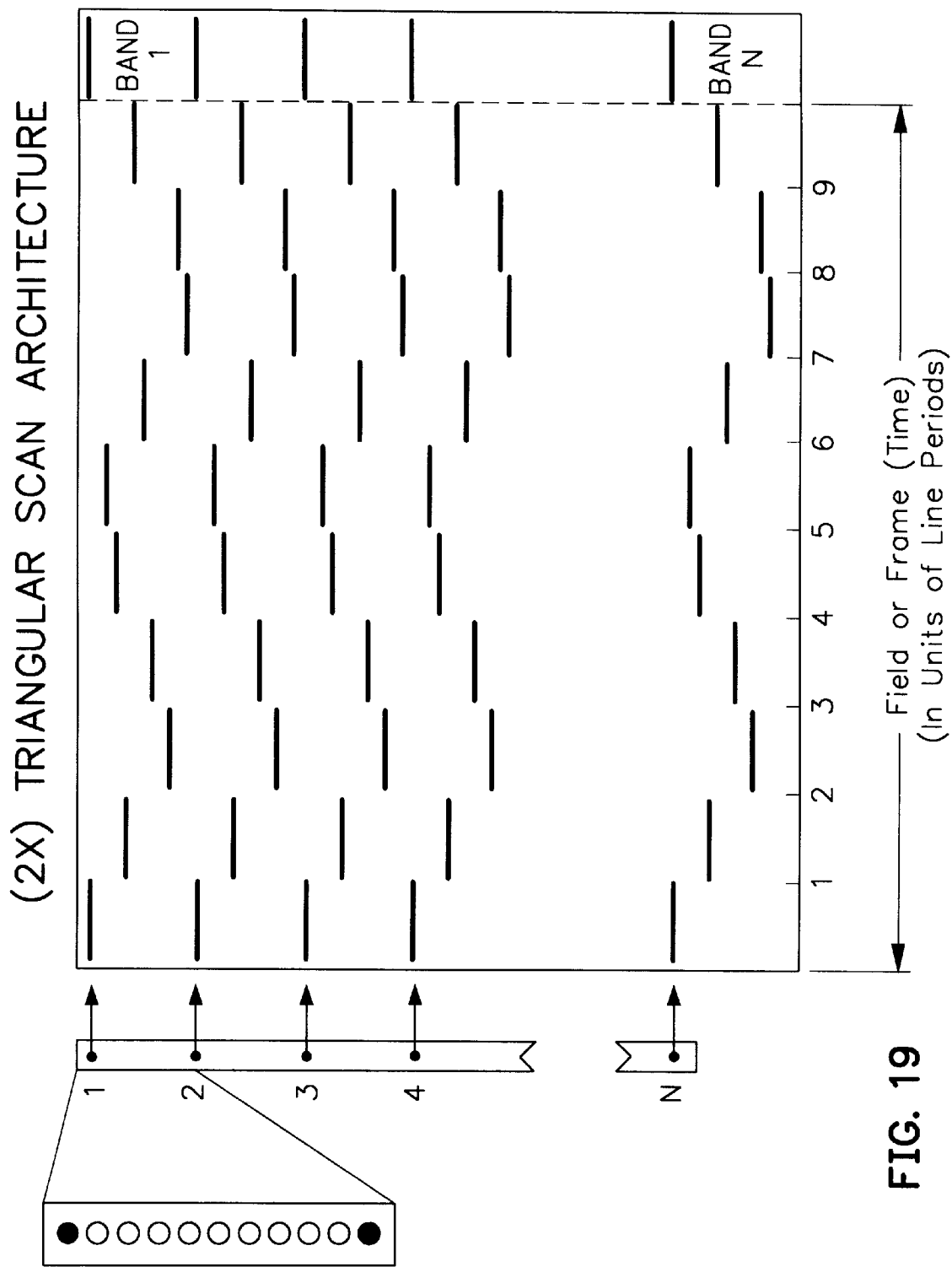
FIG. 19 illustrates a 2X triangular image scanning format.

FIG. 19 illustrates a 2X triangular scan format. In the 2X triangular scan format, each beamlet starts out at the first line of a band. The beamlet then skips three lines and writes the fourth line. Once, the beamlet reaches the bottom of the band, the beamlet reverses its progression up the band. The triangular pattern is repeated twice so that upon the completion of two triangular passes all of the lines have been written. An example of the 2X triangular scan format illustrating the order in which the lines are written is provided below with reference to FIG. 23. The scanning pattern illustrated in FIG. 19 depicts 10 lines in a band.

FIGS. 20–29 illustrate the beamlet progression on the screen lines during the scanning process for various formats.

The time for each of the figures is shown along the horizontal axis in units of line periods and the vertical axis shows the position of a line within a band. Each of FIGS. 20–29 illustrates the scanning process for two frames X and Y and the first line period of a third frame. Immediately to the right of the line number is a value which indicates the number of times a line is written during the two frames X and Y. A line scanned during a line period is indicated by a one in the box corresponding to the indicated time and line. If the box is empty, that line is not being written during that line period.

For the non-interleaved scanning formats such as are illustrated in FIGS. 20, 21, 22 and 23 only one band is shown to illustrate the scanning operation. All of the bands of these formats are written identically. These same scanning formats correspond to the formats described with reference to FIGS. 16–19 above.

Figure 20:
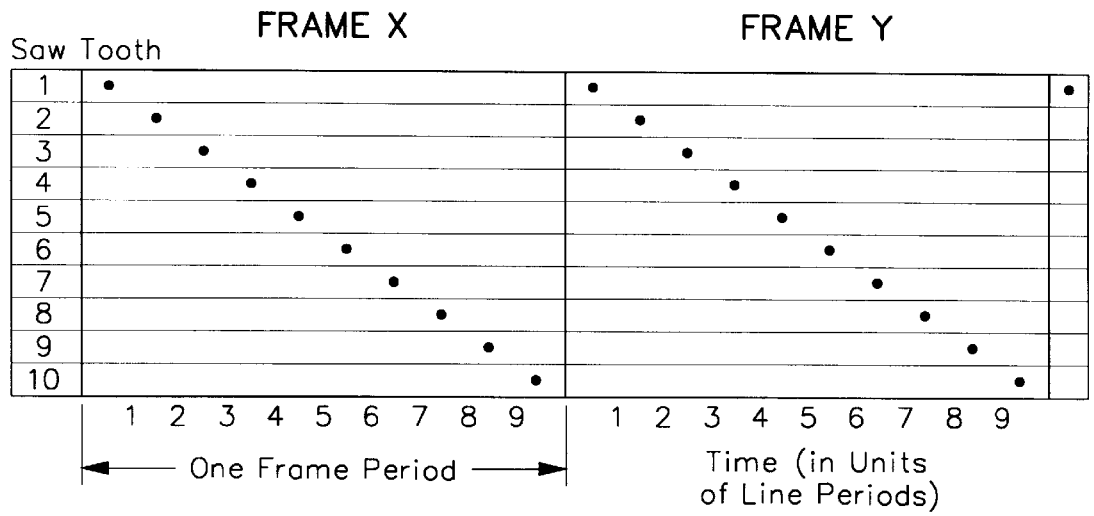
FIG. 20 illustrates the saw tooth image format shown in FIG. 16 for one band.

FIG. 20 illustrates a saw tooth scanning format. In a frame X the first beamlet writes line 1 and progresses to line 10 of the band progressively writing each line in the band in succession. In the next frame Y, the first beamlet repeats the scanning process starting again at line 1. Each beamlet for each band operates in a similar manner.

Figure 21:
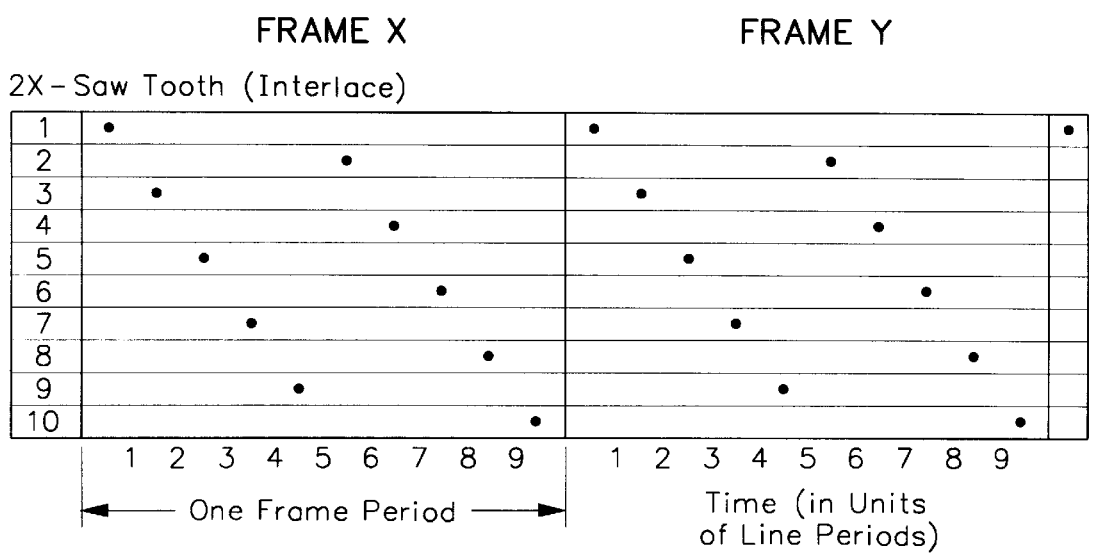
FIG. 21 illustrates the 2X saw tooth format shown in FIG. 17 for one band.

FIG. 21 illustrates the 2X saw tooth (interlace) scanning format. A first beamlet writes line 1 and progressively writes every odd line until line 9. The first beamlet then restarts at line 2 and writes every even line to line 10 which completes one frame. Other beamlets use the same scanning format in other bands.

Figure 22:
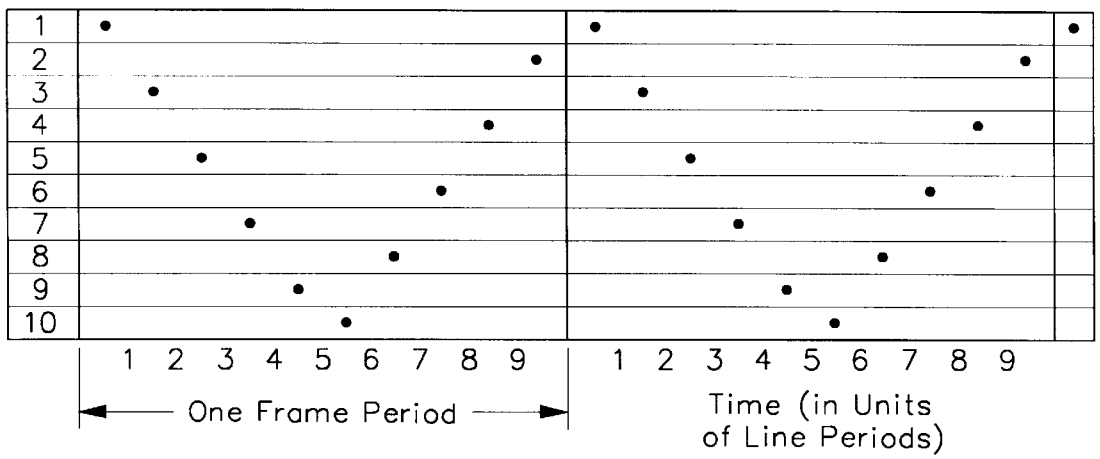
FIG. 22 illustrates the triangular wave scanning format shown in FIG. 18 for one band.

FIG. 22 illustrates the triangle wave (interlace) scanning format. In a frame X, starting at line 1, the laser beamlet writes every other line until line 9. Then, starting at the bottom of the band, the laser beamlet switches direction and proceeds to write lines 10 to line 2 skipping every other line. In the next frame Y, the pattern is repeated Beamlet writes to each of the other bands in a similar manner.

Figure 23:
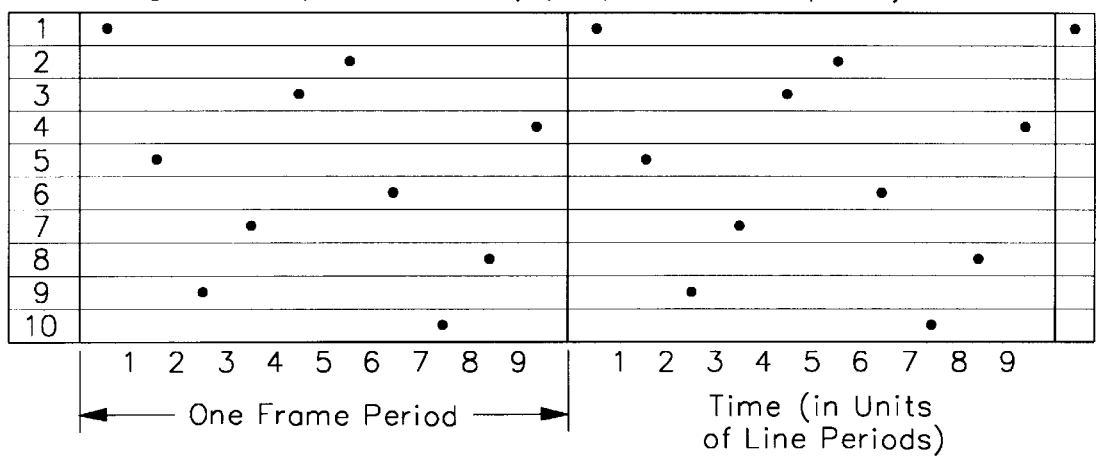
FIG. 23 illustrates the 2X triangular wave pattern shown in FIG. 19 for one

FIG. 23 illustrates the 2X triangle wave scanning format. This is the same scanning format illustrated in FIG. 19. The pattern for beamlet 1 starts at line 1, and writes every fourth line. The sequence of lines written are: 1, 5, 9, 7, 3, 2, 6, 10, 8 and finally 4. In a second frame Y, the beamlet repeats the same scanning pattern.

The beamlets of the interleaved scanning formats depicted in FIGS. 24–29 cross into neighboring bands. Therefore, more than one modulator element contributes to the intensity of one band in these formats and therefore multiple bands are shown in each figure to fully explain each format. In addition, those formats include omitted bands of the top and bottom of the frame which are not displayed on the display screen.

Figure 24:
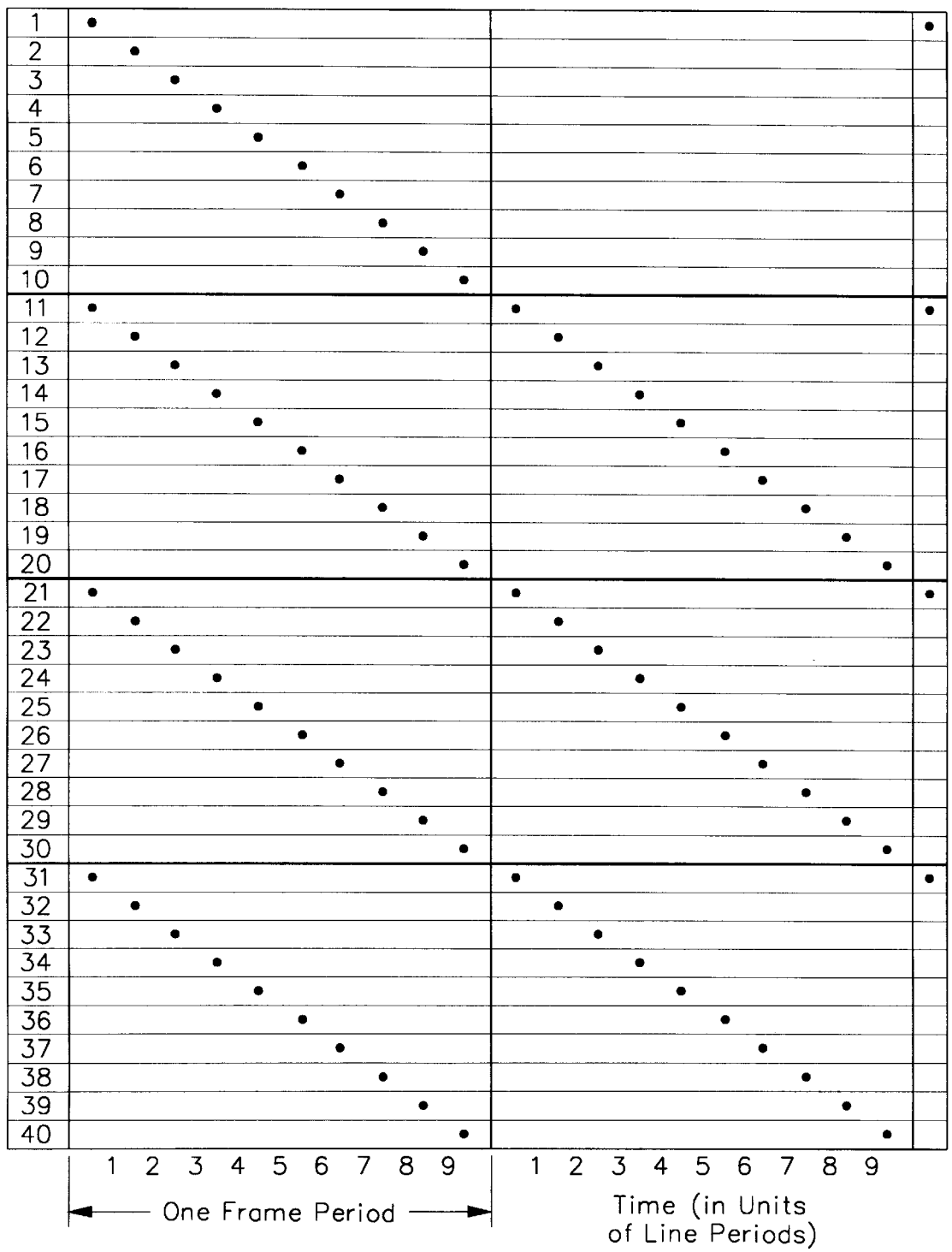
FIG. 24 illustrates a saw tooth interleaved pattern for three bands.

In FIG. 24, the saw tooth interleaved format operates identically to the simple saw tooth format illustrated in FIG. 21 during the first frame period. However, in the second frame period, the beamlets continue down into the band immediately below. For example, in the first frame period, the first beamlet scans an omitted (not displayed) band and the second beamlet adjacent to the first beamlet scans the first (displayed) band. In the second frame period, the first beamlet scans the first band and the second beamlet scans the second band. The pattern then repeats.

Figure 25:
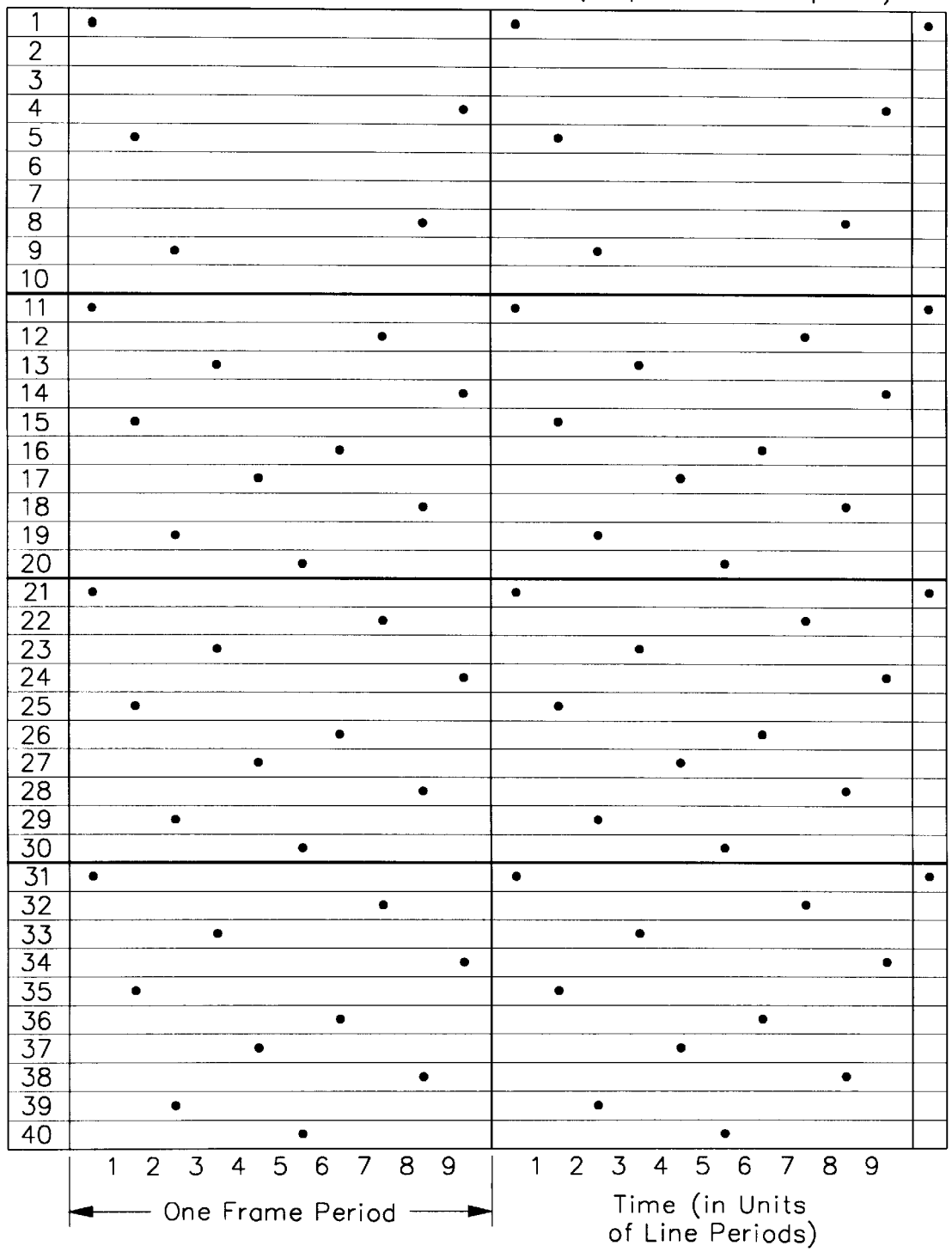
FIG. 25 illustrates a 2X triangle wave interlaced/interleaved scanning format for three bands.

FIG. 25 illustrates the 2X triangle wave interlaced/interleaved scanning format. In the 2X triangle wave interlaced/interleaved scanning method, the beamlets write every fourth line. In the first half of the frame X, each beamlet writes in a first band in the second half of the frame X, each beamlet writes in the adjacent band. In the second frame Y, the operation repeats. For example, starting at line 1, a beamlet writes to the omitted band. The beamlet then skips four lines and writes to line 5 followed then by line 9. The beamlet then moves to band one where it writes to lines 13, 17 and 20. The beamlet then reverses its progression and writes lines 16, 12, 8 and 4. The beamlet restarts the pattern beginning at line 1.

Figure 26:
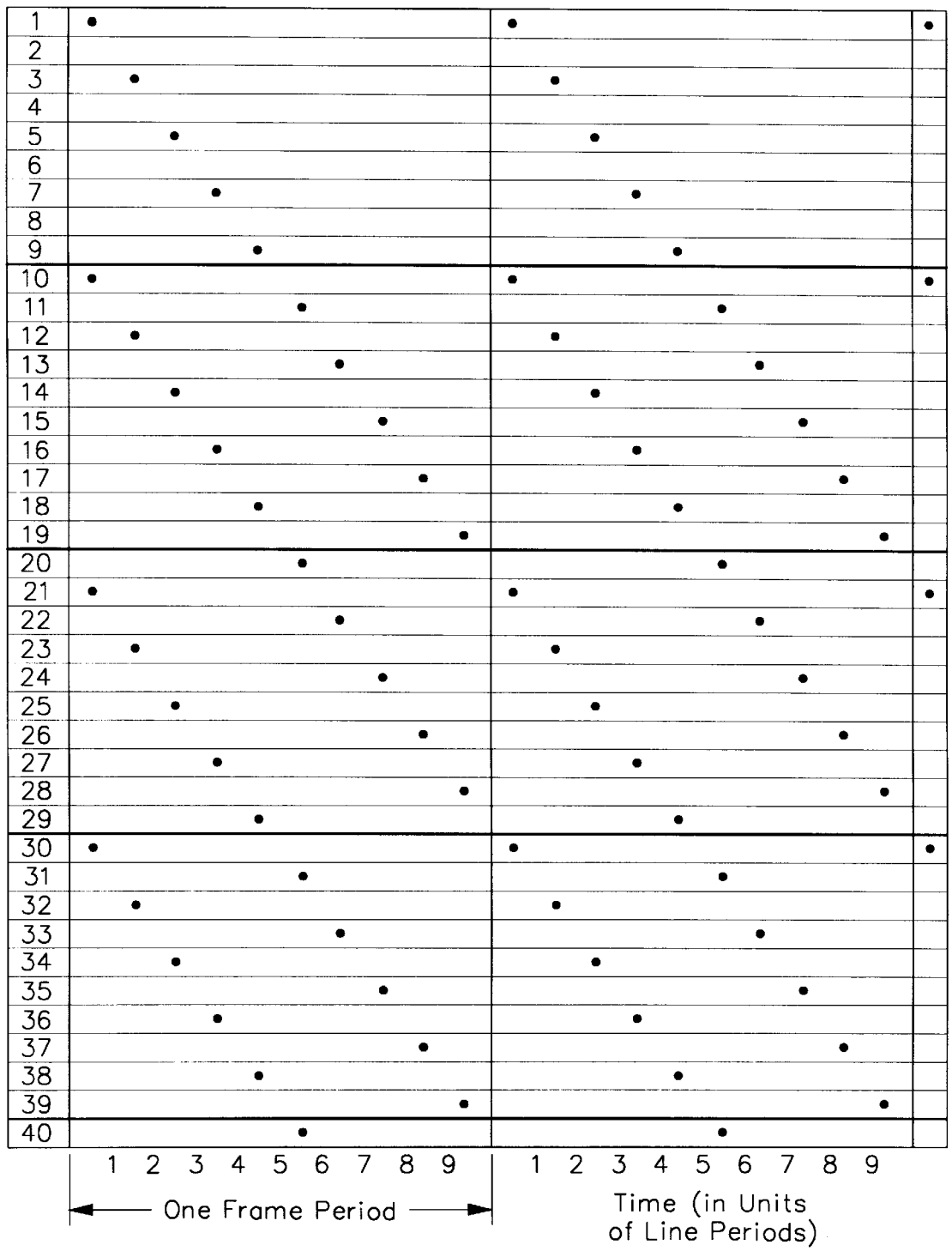
FIG. 26 illustrates a 2X saw tooth interlaced/interleaved scanning format for three bands.

FIG. 26 illustrates the 2X saw tooth interlaced/interleaved scanning format. In this format, the first beamlet writes the odd lines in the omitted band starting at line 1 during the first half of a frame period and the second beamlet writes the odd lines in the first band starting at line 10. In the second half of a frame period, the first beamlet writes the even lines in the first band and the second beamlet writes the even lines in the second band. In a second frame, the beamlet repeats the pattern.

Figure 27:
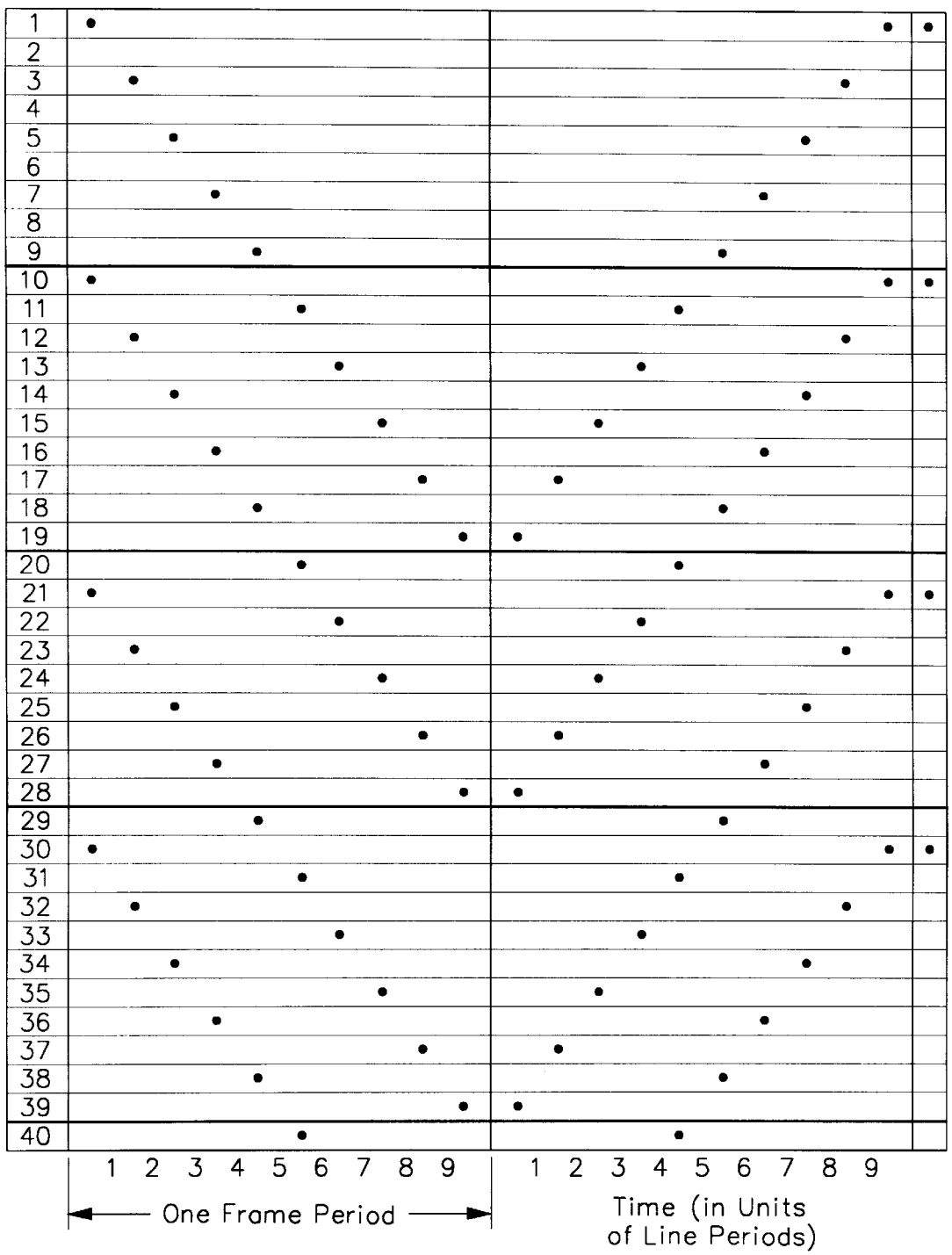
FIG. 27 illustrates a triangle wave interlaced/interleaved scanning format for three bands.

FIG. 27 illustrates the triangle wave interlaced/interleaved scanning format. In this format each beamlet writes every other line in a descending pattern across two adjacent bands during a first frame X and then writes every other line in an ascending order across two bands in a second frame Y. For example, as shown in FIG. 27 a first beamlet in a frame X begins writing line 1 of an omitted band and then writes to every other line continuing down into the adjacent band. At the beginning of the next frame Y, the first beamlet begins by writing the last line of band 1 and then writes every other line in an ascending order ending at the first line of the omitted band at the end of the frame Y. The second beamlet follows a similar pattern spanning the first and second bands and writing only to the even numbered lines. That pattern is repeated for all of the beamlets with the first and last bands not being displayed.

Figure 28:
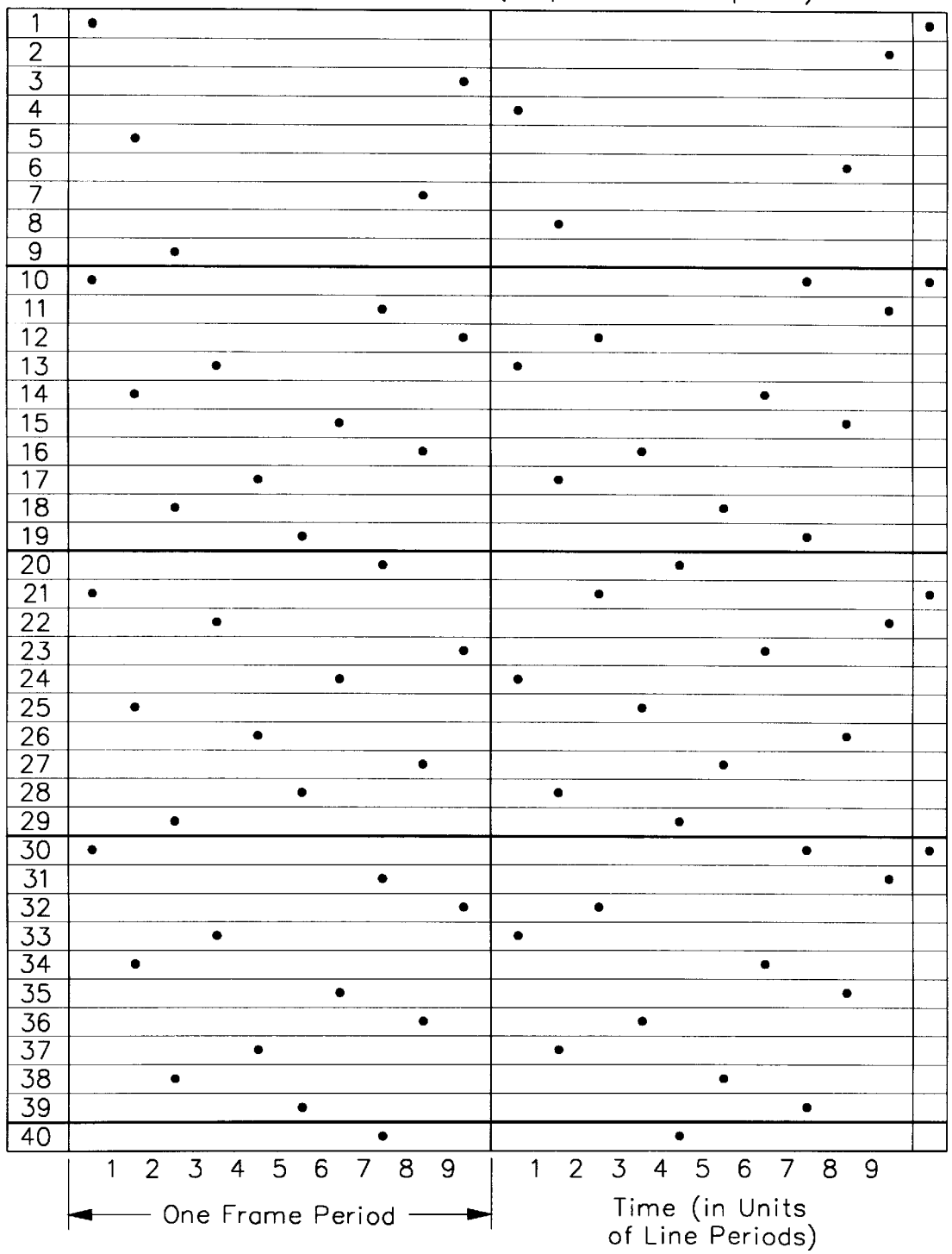
FIG. 28 illustrates a triangle interlace/interleaved scanning format for three bands.

FIG. 28 illustrates the 2X triangle interlaced/interleaved scanning format. In a first frame X, a beamlet starting at line 1 progresses to line 19 writing every fourth line. The beamlet writes to the lines 1, 5, 9, 13, 17 and then 19. At line 19, it reverses its progression and writes the lines 15, 11, 7 and 3. In the second frame Y, the beamlet writes to the lines 4, 8, 12, 16 and 20. The beamlet then reverses its progression and writes lines 18, 14, 10, 6 and 2. Starting at the third frame, the beamlet repeats the pattern. A second beamlet starts the scanning pattern at line 10 (the first line of band one) and follows a similar pattern across bands one and two as was described for the first beamlet across the omitted band and band one.

Figure 29:
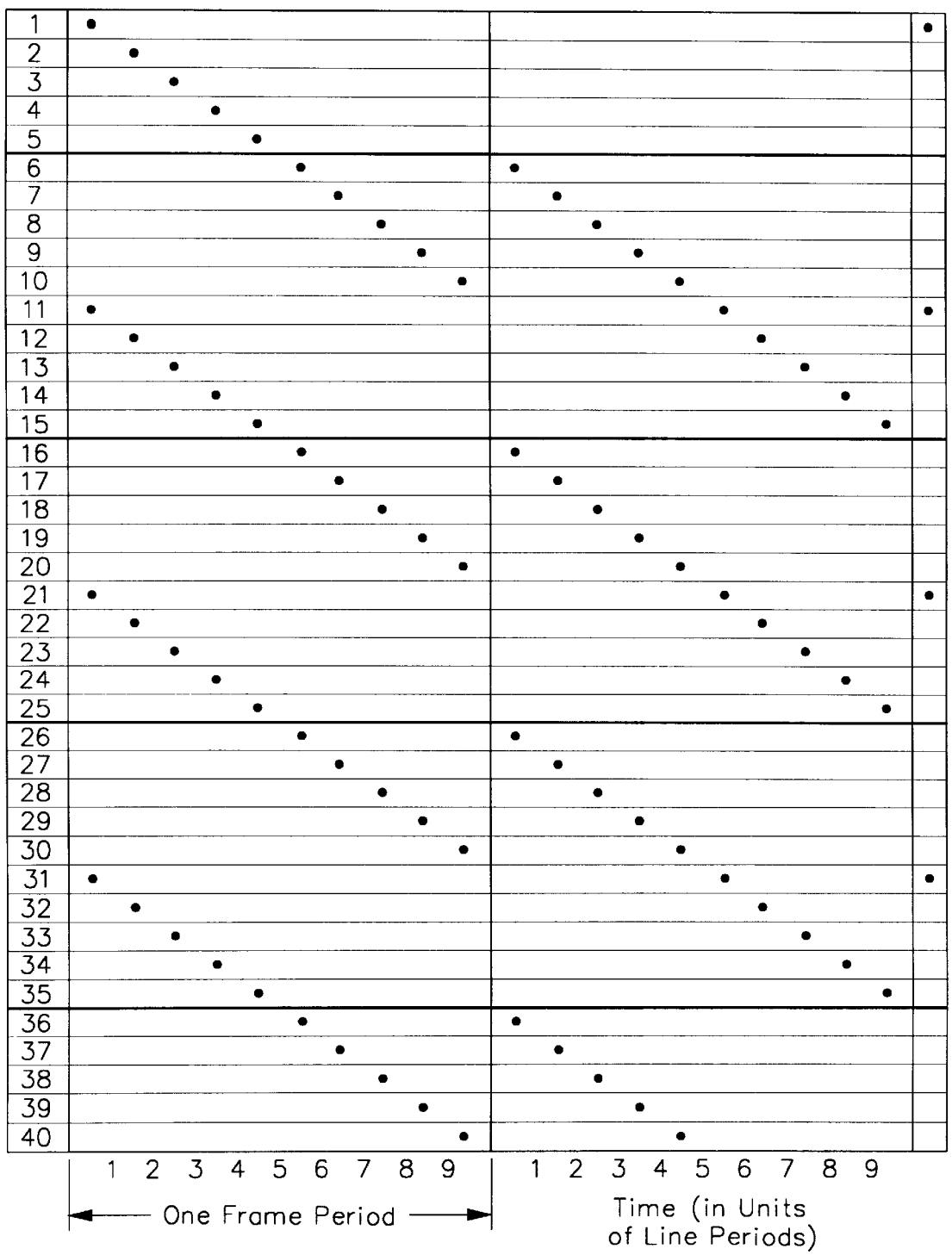
FIG. 29 illustrates a saw tooth interleaved blended scanning format for three bands.

FIG. 29 illustrates the saw tooth interleaved blended scanning format. The saw toothed interleaved blended format resembles the saw tooth interleaved format (shown in FIG. 20) but differs in that during the second frame period, the vertical scanning restarts at 50% (half) of the scanning range of the beamlet. In the first half of the first frame period, a first beamlet scans an omitted band and a second beamlet scans the bottom half of the first band. In the second half of the first frame period, the first beamlet scans the top half of the first band and the second beamlet scans the top half of the second band. In the second frame period, the first beamlet writes the first band sequentially from top to bottom and the second beamlet writes the second band sequentially from top to bottom. The pattern then repeats. To further illustrate, starting at line 1, in frame X, a beamlet writes to lines 1 through lines 10. In frame Y the beamlet writes lines 6 through 15.

It may be desirable in certain circumstances to scan in a step like manner using a block of pixels. For example, in an 800 by 800 pixel frame system it is possible to scan a frame using an 8×8 block of pixels stepping horizontally in eight pixel steps across eight line bands. One way to accomplish such a scan format includes reformatting beamlets from a line of widely spaced pixels to a block of contiguous pixels, for example a rectangle or square of contiguous pixels.

Figure 30:
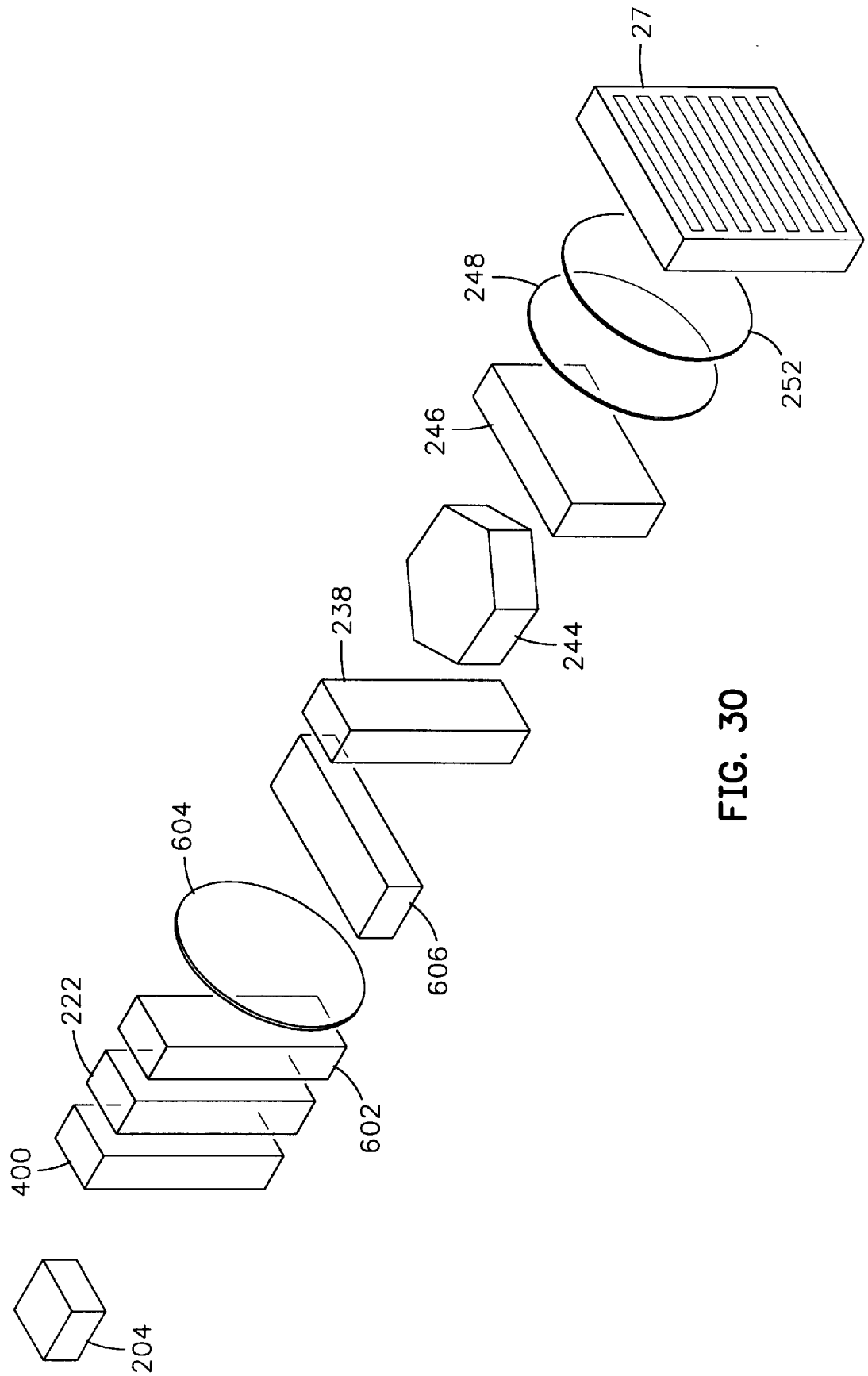
FIG. 30 is a block diagram illustrating an embodiment of the components of another imaging system for step scanning.

FIG. 30 is a block diagram of the components of such a system showing only the components for a single color with identical components being used for the other colors as in the systems described above. In addition, some of the elements previously described for such display systems as in FIG. 13 have been omitted for clarity and like elements are identified by the same reference numbers as in FIG. 13. The microlaser source 204 generates a (green) laser beam that passes through the beam shaping device 400 that generates the beamlets as described above. The modulator 222 modulates each of the beamlets which then enter a converter 602. The converter 602 may be a fiber optic converter that has the same number of fibers as the number of modulator elements in the spatial light modulator 222. Each fiber is aligned with a modulator element so that the light traveling through that element is captured by the fiber. The fiber then transmits the light from the modulator 222 to the other end of the fiber. The ends of the fibers are grouped into a rectangular array, thereby creating a block of pixels.

The reformatted beamlets are then collimated by a collimating apparatus 604 which operates in a manner similar to that of the collimating lens 242 of FIG. 13.

The collimator lens 604 collimates the optical beams from the output of the fiber optic converter 602 and forms a pupil in an acousto-optical or electro-optic scanner 606.

The acousto-optic scanner 606 scans the beams in a direction opposite to the scanning direction of the polygon scanner 244. The scanner 606 scans the beams at the same velocity as the polygon scanner 244, thereby having the ability to effectively stop or freeze the display of laser beamlets on the screen. The scanner 606 only stops the scan for a brief moment and then allows the polygon scanner 244 to effectively jump the scan to the position of the next block of pixels to be displayed. In this manner, the array of pixels steps across the frame until a row is completely written. Then, when the next facet of the polygon mirror comes around the process is repeated for the next group of lines. Since the angle of deflection in acousto-optic and electro-optic scanners can be dependent upon wavelength, each color (red, green, and blue) can be provided with a separate scanner 606.

Typically, the color combiner 238 comes after the scanner 606. The polygon scanner 244, the galvanometric scanner 246, the reimager lens 248, the projection lens 252, and the screen operate in the same manner as was described above.

Figure 31:
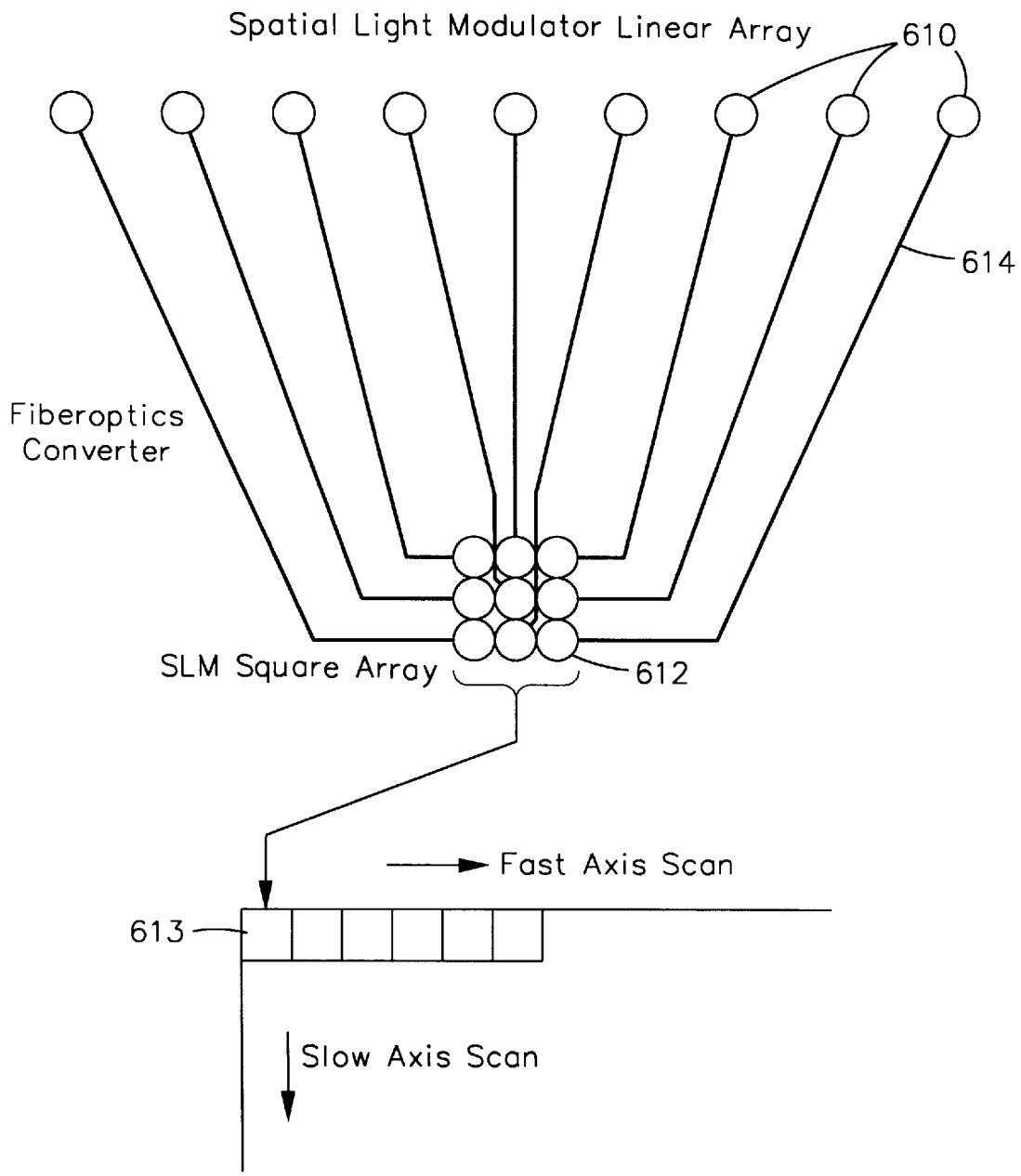
FIG. 31 is a diagram illustrating some of the features of a fiber optic converter.

FIG. 31 is a schematic diagram illustrating some of the features of the fiber optic converter 602. Each fiber optic cable 614 in the converter receives the light output from an individual element of the modulator 222 at an end 610. The light is transmitted along the cable 614 to an output end 612. The output ends can be arranged in the desired format and with the desired spacing required by the system. In the example shown in the figure, a 3×3 block of pixels is created by the arrangement of the output ends and the block of pixels 613 is then stepped across the frame as was described above.

FIG. 22 is a block diagram illustrating one embodiment of the imaging system for implementing a pushbroom scan. In addition, some of the elements previously described for such display systems as in FIG. 13 have been omitted for clarity and like elements are identified by the same reference numbers as in FIG. 13. This canning technique is a variation of the step scan approach (shown in FIG. 30 and 31), where a rectangular array of pixels at the output of the converter 602 is a linear array 1 pixel wide by a pixels long. In this embodiment, the acousto-optic or electro-optic scanner 606 is not needed. The conversion process from a widely spaced array of pixels to a closely spaced linear array of pixels can be accomplished in one of two ways.

Figure 33:
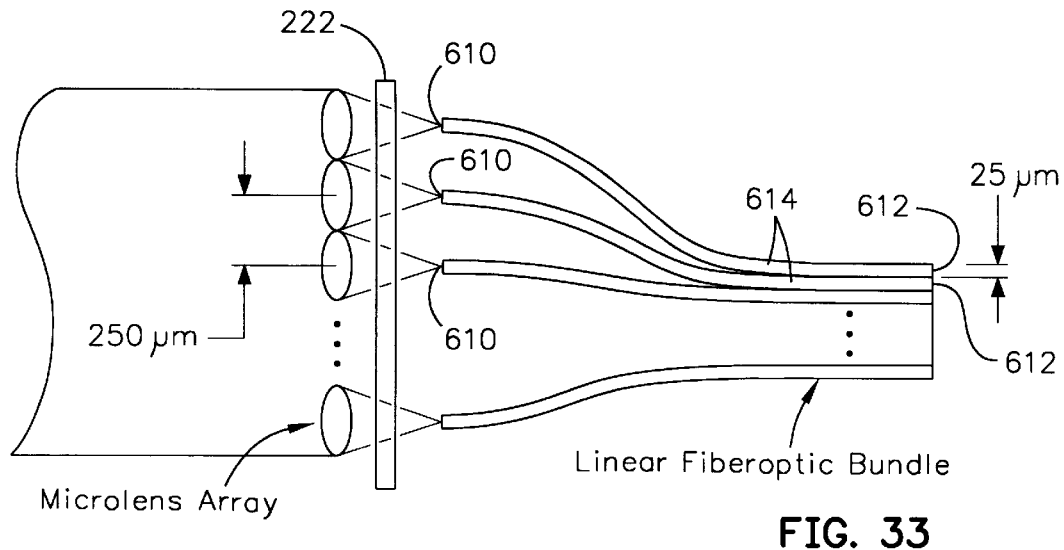
FIG. 33 is a diagram of a linear fiber optic array for pushbroom scanning.

First, as described above, a fiber optic converter can be used as shown in FIG. 33. FIG. 33 is a schematic diagram of a linear fiber optic array for pushbroom scanning. The pushbroom scanning array is similar to the converter 602 illustrated in FIG. 31. Each fiber 614 receives the light output from a single element of the modulator 222 at an end 610. The fibers transmit the received light to an output end 612 with each of the output ends arranged in a linear array.

Figure 32:
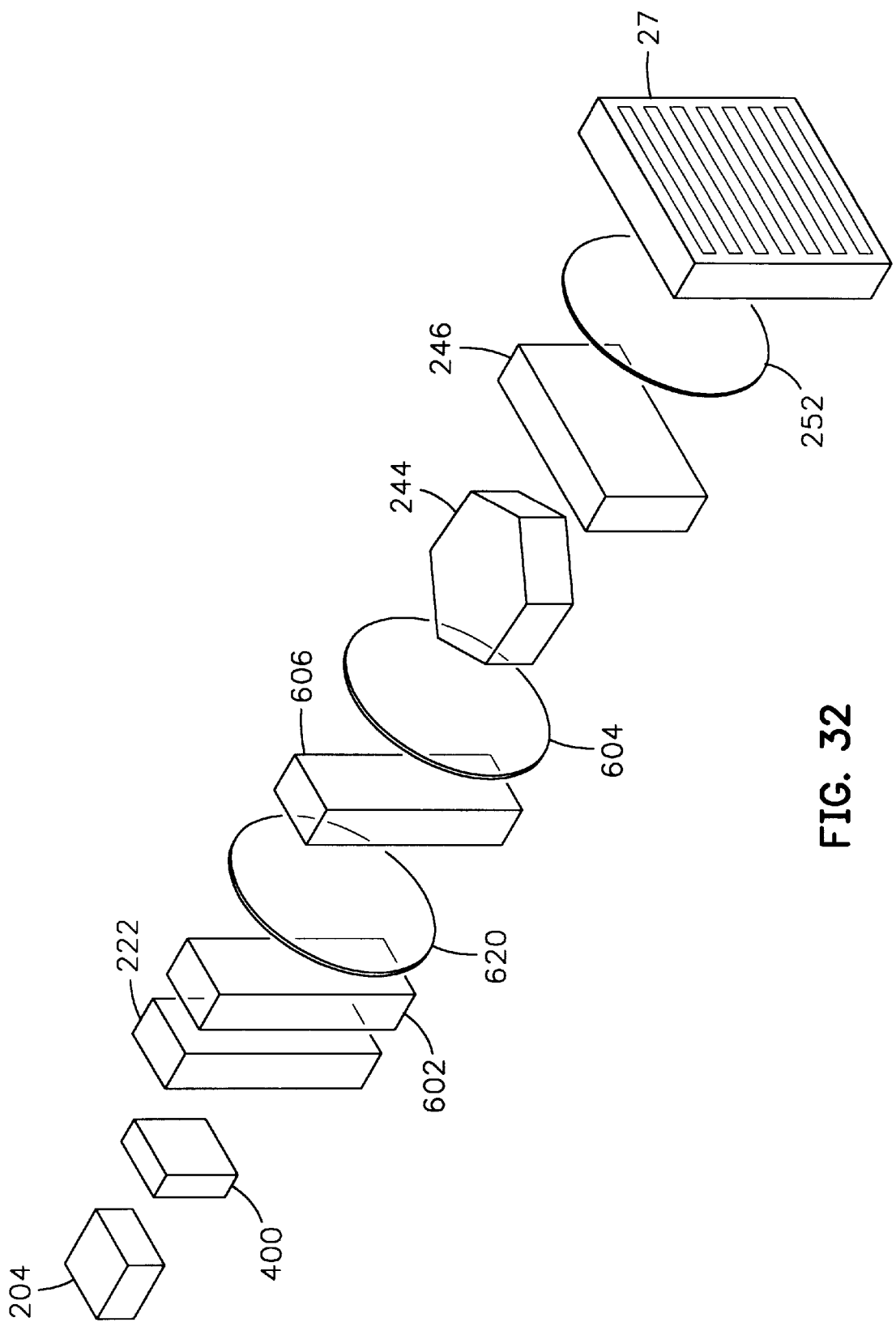
FIG. 32 is a block diagram illustrating one embodiment of an imaging system for implementing a pushbroom scan.
Figure 34:
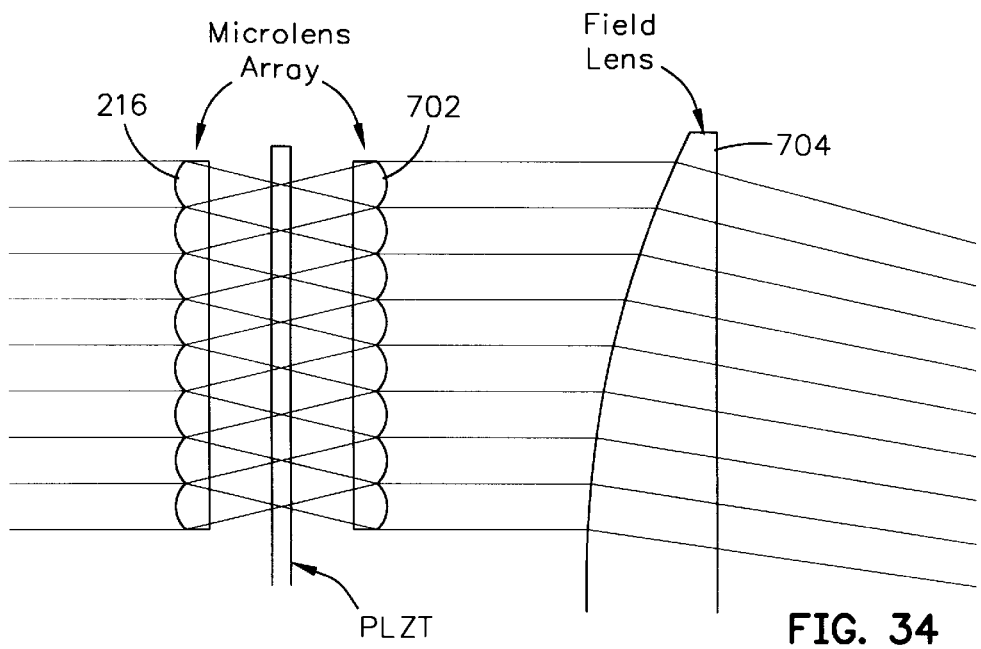
FIG. 34 shows a light path of the laser beamlets traveling from a micolens array through a PLZT modulator.
Figure 35:
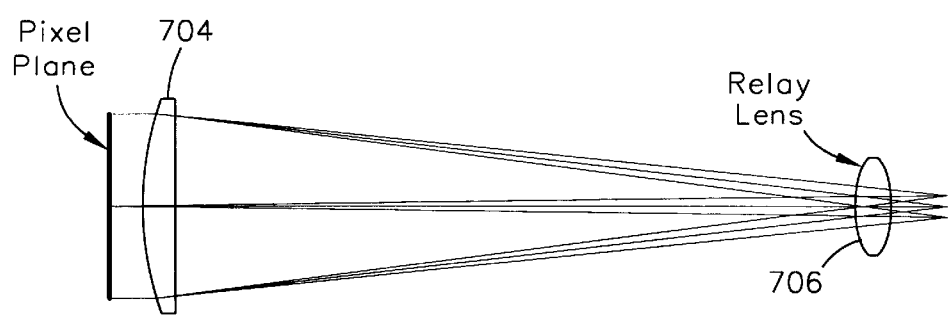
FIG. 35 is a block diagram illustrating the effect of a relay lens on a laser beamlet during a pushbroom scan.

Another embodiment of the invention uses a microlens array 702, a field lens 704, and a relay lens 706 as shown in FIGS. 34 and 35 to generate the linear array. FIGS. 34 and 35 illustrate in further detail selected portions of this system. FIG. 34 shows a light path of the laser beamlets traveling from the microlens array 214 through the PLZT device. The light output from each element of the PLZT device is received by the microlens array 702 which recollimates the light. The field lens focuses the output light beams from the microlens array 702 onto the pupil of the relay lens 706 shown in FIG. 35. The relay lens 706 demagnifies this array and relays the pixel plane to the input of the collimator lens 604 in FIG. 32. The purpose and operation of the collimator lens 604, the color combiner 238, the polygon scanner 244, the galvanometric scanner 246, the reimager lens 248, and the projection lens 252, are the same as have previously been described.

Upon review of the above detailed description it is likely that modifications and improvements will occur to those skilled in the art which are within the scope of the accompanying claims. For example, additional laser sources and modulators could be used. Furthermore, one or more of the laser sources may produce non-visible laser light, such as infrared radiation through night-vision goggles. In addition, many of the elements of the various systems described herein can be replaced by equivalent elements which accomplish the same objective. For example, various sources of laser light can be used as can different lens arrangements. Therefore, the scope of this invention should not be limited by the examples provided.

What is claimed is:

1. A laser projection system for projecting an image with reduced speckle on a display surface, comprising:
    a light modulator for modulating laser light responsive to signals indicative of said image;
    an optical system that defines an intermediate image plane for said modulated laser light, said intermediate image plane situated between said light modulator and the display surface;
    a speckle eliminator situated approximately at said intermediate image plane and comprising a diffusion plate, motion-inducing elements coupled to said diffusion plate and arranged approximately orthogonally with respect to said diffusion plate and means for energizing said motion-inducing elements to provide a non-zero phase shift between the motions of said orthogonal elements, thereby avoiding periodic moments of zero velocity; and
    an optical imaging system arranged to image said intermediate image plane and project diffused modulated laser light from said speckle eliminator on the display surface to display an image.

2. The laser projection system of claim 1 wherein said diffuser comprises wax for diffusing said modulated laser light.

3. The laser projection system of claim 1 wherein said speckle eliminator comprises a non-flowing fluid diffuser including a pair of substantially parallel plates and a substantially non-flowing fluid having a particulate suspension situated between said pair of plates.

4. The laser projection system of claim 1 wherein said speckle eliminator comprises a flowing fluid diffuser including a pair of substantially parallel plates and a turbid fluid flowing between said plates.

5. The laser projection system of claim 1 wherein said nutational motion provides a substantially constant transverse velocity.

6. The laser projection system of claim 1 herein said phase shift is approximately 90°.

7. The laser projection system of claim 1 wherein said motion-inducing elements comprise a flexible support member coupled to said diffusion plate; and said means for
    energizing comprises a pair of orthogonal electromagnets arranged to nutate said diffusion plate.

8. The laser projection system of claim 1 wherein said light modulator includes a spatial light modulator (SLM).

9. The laser projection system of claim 1 wherein said light modulator includes an array of individually addressable lasers.

10. A method of eliminating speckle in an image displayed on a display surface by a laser projection system, comprising:
    modulating laser light responsive to signals indicative of the image;
    diffusing said modulated laser light through a diffuser situated at an intermediate image plane in the laser projection system to substantially eliminate speckle in the displayed image by nutating a diffusion plate in the modulated laser light at said intermediate image plane, said nutational motion being approximately orthogonal to the propagation direction of the modulated laser light and avoiding periodic movement of zero velocity; and
    imaging said intermediate image plane on the display surface, including projecting diffused modulated laser light to display an image.

11. The method of claim 10 wherein said diffusing step further comprises flowing a turbid fluid between a pair of plates situated at said intermediate image plane.

12. The method of claim 10 wherein said diffusing step further comprises moving a diffusion plate situated at said intermediate image plane.

13. The method of claim 12 wherein said diffusing step further comprises spinning a diffusion plate situated at said intermediate image plane.

14. The method of claim 10 wherein said modulating step includes modulating unmodulated laser light with a spatial light modulator.

15. The method of claim 10, further comprising a scanning step wherein said modulated laser light is scanned across said display surface to generate said image.

16. The method of claim 15 wherein said diffusing step includes diffusing said scanned laser light.

17. The method of claim 10, further comprising:
    generating a linear array of modulated laser beams having an approximately uniform spacing between adjacent beams;
    individually modulating the intensity of said laser beams with a linear spatical light modulator (SLM) placed in the optical path of said laser beam array, thereby providing said modulated linear array of individually modulated laser beams with a uniform spacing between adjacent beams;

scanning said modulated array in a predetermined scanning configuration;

reducing speckle by propagating said scanned modulated array through a diffuser situated approximately at an intermediate image plane; and imaging said scanned modulated array, including projecting said scanning configuration on a projection screen to display a scanned image.

18. The method of claim 17, wherein said speckle reducing step comprises nutating a diffusion plate in the modulated laser light at said intermediate image plane, the nutational motion being approximately orthogonal to the propagation direction of the modulated laser light.

19. The method of claim 17, and further comprising generating a first linear array of modulated laser beams having a first color, a second linear array of modulated laser beams having a second color, and a third linear array of modulated laser beams having a third color.

20. The method of claim 19 and further comprising optically combining said first, second and third linear arrays so that those outputs are in precise registration with each other, thereby combining said first, second, and third arrays to generate a single combined linear array, and then scanning said combined linear array.

21. The method of claim 20 wherein said scanning step includes scanning said modulated linear array in a predetermined two-dimensional scanning configuration, including scanning a first group of parallel scan lines in a first time interval, then shifting said scan lines orthogonally, then scanning a second group of parallel scan lines parallel to said first group in a second time interval.

22. The method of claim 10, further including motive elements arranged approximately orthogonally with respect to said diffusion plate, and further comprising the step of energizing said motive elements with a non-zero phase shift.

23. The method of claim 22 wherein said predetermined phase shift is approximately 90°, thereby avoiding periodic moments of zero velocity.

24. A scanning projection system for projecting an image on a display surface, comprising:

a plurality of spatial light modulators (SLMs) that modulate laser light and generate a corresponding plurality of linear arrays of modulated laser beams with an approximately uniform spacing between adjacent beams, each of said linear SLMs having a monolithic structure including a plurality of modulator elements arranged in a linear configuration with an approximately constant pitch, a scanner arranged for scanning said modulated laser light; and an optical system defining an intermediate image plane for said linear arrays of modulated light between said scanner and said display surface;

a speckle eliminator situated approximately at said intermediate image plane and comprising a diffuser plate, and motion-inducing elements coupled to said diffuser plate and orthogonally arranged with respect to said diffusion plate to provide a non-zero phase shift between the motions of said orthogonal elements thereby avoiding periodic moments of zero velocity; and an optical imaging system that images said intermediate image plane and projects said scanned modulated laser light on the display surface to display a scanned image.

25. The scanning projection system of claim 24, wherein said scanner includes means for two-dimensional scanning of said modulated laser beams, including means for scanning a first group of parallel lines in a first time interval and a second group of parallel lines in a second time interval.

26. A laser projection system for projecting an image with reduced speckle on a display surface, comprising:

a light modulator for modulating laser light responsive to signals indicative of said image;

an optical system that defines an intermediate image plane for said modulated laser light, said intermediate image plane situated between said light modulator and the display surface;

a speckle eliminator including a wax diffusion plate situated approximately at said intermediate image plane; and an optical imaging system arranged to image said intermediate image plane and project diffused modulated laser light from said speckle eliminator on the display surface to display an image.

* * * * *

UNITED STATES PATENT AND TRADEMARK OFFICE
CERTIFICATE OF CORRECTION

| | |
|---|---|
| PATENT NO. | : 6,154,259 |
| APPLICATION NO. | : 08/978655 |
| DATED | : November 28, 2000 |
| INVENTOR(S) | : Hargis et al. |

It is certified that error appears in the above-identified patent and that said Letters Patent is hereby corrected as shown below:

On the title page under the heading Related U.S. Application Data please replace:

"Provisional application No. 60/031,697, Nov. 25, 1996" with
--Provisional application No. 60/031,697, Nov. 27, 1996 --.

On the title page under the heading Related U.S. Application Data, please add:

--[63] Continuation-in-part of application No. 08/727,618, filed October 7, 1996, now U.S. Patent No. 5,990,983, which is the U.S. National Phase of application No. PCT/US94/11181, filed September 30, 1994, which claims priority to U.S. Patent No. 5,534,950, filed October 4, 1993. --.

At Column 1, line 6, under the heading CROSS REFERENCE AND RELATED APPLICATIONS, please replace:

"The benefit is hereby claimed under 35 U.S.C. §119 (e) to U.S. provisional application No. 60/031,697, filed Nov. 25, 1996." with
--The benefit is hereby claimed under 35 U.S.C. §119 (e) to U.S. provisional application No. 60/031,697, filed No. 27, 1996. This application is a continuation-in-part of application No. 08/727,618, filed October 7, 1996, now U.S. Patent No. 5,990,983, which is the U.S. National Phase of application No. PCT/US94/11181, filed September 30, 1994, which claims priority to U.S. Patent No. 5,534,950, filed October 4, 1993. --.

Signed and Sealed this

Twenty-ninth Day of August, 2006

JON W. DUDAS
*Director of the United States Patent and Trademark Office*